United States Patent
Kim et al.

(10) Patent No.: US 7,529,327 B2
(45) Date of Patent: May 5, 2009

(54) METHOD AND APPARATUS FOR COMPENSATING FOR THE FREQUENCY OFFSET IN INTERLEAVED FREQUENCY DIVISION MULTIPLE ACCESS

(75) Inventors: Yung-soo Kim, Seongnam (KR); Chan-soo Hwang, Yongin (KR)

(73) Assignee: Samsung Electronics Co., Ltd. (KR)

( * ) Notice: Subject to any disclaimer, the term of this patent is extended or adjusted under 35 U.S.C. 154(b) by 743 days.

(21) Appl. No.: 10/607,106

(22) Filed: Jun. 25, 2003

(65) Prior Publication Data

US 2004/0071239 A1    Apr. 15, 2004

(30) Foreign Application Priority Data

Jul. 27, 2002    (KR) .................. 10-2002-0044461

(51) Int. Cl.
*H03D 1/04* (2006.01)
*H04B 1/707* (2006.01)
(52) U.S. Cl. ...................... 375/346; 375/148
(58) Field of Classification Search ............. 375/316, 375/346, 130, 147, 148
See application file for complete search history.

(56) References Cited

U.S. PATENT DOCUMENTS

| | | | | |
|---|---|---|---|---|
| 5,894,473 | A * | 4/1999 | Dent | 370/342 |
| 7,139,237 | B2 * | 11/2006 | Nangia et al. | 370/208 |
| 2002/0045433 | A1 * | 4/2002 | Vihriala | 455/313 |
| 2003/0095590 | A1 * | 5/2003 | Fuller et al. | 375/148 |

OTHER PUBLICATIONS

Sorger et al., "Interleaved FDMA-A New Spread-Spectrum Multiple-Access Scheme", Jun. 7, 1998.
Schnell et al., "Application of IFDMA To Mobile Radio Trnasmission", Oct. 5, 1998.
Schnell et al., "A Promising New Wideband Multiple-Access Scheme For Future Mobile Communications Systems", Jul. 1999.
Cao et al., "Efficient Structure-Based Carrier Frequency Offset Estimation For Interleaved OFDMA Uplink", May 11, 2003.

\* cited by examiner

*Primary Examiner*—Kevin M Burd
(74) *Attorney, Agent, or Firm*—The Farrell Law Firm, PC

(57) ABSTRACT

Provided are a method and apparatus for compensating for a frequency offset in an interleaved frequency division multiple access. The method compensates for a frequency offset between a transmission signal and a reception signal for a $u^{th}$ user ($1 \leq u \leq U$, where U denotes the number of users) in an interleaved frequency division multiple access. The method includes: (a) estimating the frequency offset from a selection signal that is determined as the reception signal for the $u^{th}$ user in an initial mode and as a feedback signal in a normal mode; (b) estimating multiple access interferences representing an extent to which reception signals for $i^{th}$ other users ($1 \leq i \leq U-1$) at the same time interfere with the reception signal for the $u^{th}$ user; (c) subtracting the estimated multiple access interferences from the reception signal for the $u^{th}$ user and determining the subtraction result as the feedback signal; (d) determining whether steps (a), (b), and (c) have been repeated a predetermined number of times, and if it is determined that steps (a), (b), and (c) have not been repeated the predetermined number of times, going back to step (a); and (e) if it is determined that steps (a), (b), and (c) have been repeated the predetermined number of times, estimating the transmission signal for the $u^{th}$ user using the feedback signal finally determined in step (c) and the estimated frequency offset.

11 Claims, 11 Drawing Sheets

METHOD AND APPARATUS FOR COMPENSATING FOR THE FREQUENCY OFFSET IN INTERLEAVED FREQUENCY DIVISION MULTIPLE ACCESS

This application claims the priority of Korean Patent Application No. 2002-44461, filed on Jul. 27, 2002, in the Korean Intellectual Property Office, the contents of which is incorporated herein in its entirety by reference.

BACKGROUND OF THE INVENTION

1. Field of the Invention

The present invention relates to a frequency division multiple access, and more particularly, to a method and apparatus for compensating for the frequency offset in an interleaved frequency division multiple access.

2. Description of the Related Art

The frequency offset in an interleaved frequency division multiple access (IFDMA) communication device decreases a signal-to-noise ratio (SNR) by changing the magnitude and phase of a signal that is transmitted from a transmitter to a receiver and creates interferences among users. IFDMA refers to a method of realizing multi-carriers in a time domain, which was disclosed in the paper of "Interleaved FDMA-A New Spread Spectrum Multiple Access Scheme", by Uli Sorger, Isabellar de Broeck, and Michael Schnell 1998 in International Conference on communication (ICC) proceedings, 1998, pp. 1013-1017. Here, the frequency offset is caused by a difference between oscillation frequencies generated by a transmission oscillator of a transmitter of the IFDMA communication device and a reception oscillator of a receiver thereof. To solve this, i.e., to minimize the frequency offset, very sophisticated analog radio frequency (RF)/intermediate frequency (IF) components should be used in the transmitter and the receiver of the IFDMA communication device. However, it is difficult to realize analog RF/IF components satisfying desired performances as the frequency offset increases. Also, although the analog RF/IF components are realized, the manufacturing cost thereof is high.

SUMMARY OF THE INVENTION

The present invention provides a method of compensating for the influence due to frequency offset in an IFDMA instead of removing the frequency offset without using the characteristics of channels.

The present invention also provides an apparatus for compensating for the frequency offset in an IFMDA to perform the method.

According to an aspect of the present invention, there is provided a method of compensating for a frequency offset between a transmission signal and a reception signal for a $u^{th}$ user ($1 \leq u \leq U$, where U denotes the number of users) in an interleaved frequency division multiple access. The method includes: (a) estimating the frequency offset from a selection signal that is determined as the reception signal for the $u^{th}$ user in an initial mode and as a feedback signal in a normal mode; (b) estimating multiple access interferences representing an extent to which reception signals for $i^{th}$ other users ($1 \leq i \leq U-1$) at the same time interfere with the reception signal for the $u^{th}$ user; (c) subtracting the estimated multiple access interferences from the reception signal for the $u^{th}$ user and determining the subtraction result as the feedback signal; (d) determining whether steps (a), (b), and (c) have been repeated a predetermined number of times, and if it is determined that steps (a), (b), and (c) have not been repeated the predetermined number of times, returning to step (a); and (e) if it is determined that steps (a), (b), and (c) have been repeated the predetermined number of times, estimating the transmission signal for the $u^{th}$ user using the feedback signal finally determined in step (c) and the estimated frequency offset.

According to another aspect of the present invention, there is provided an apparatus for compensating for a frequency offset between a transmission signal and a reception signal for a $u^{th}$ user ($1 \leq u \leq U$, where U denotes the number of users) in an interleaved frequency division multiple access. The apparatus includes: a main frequency offset estimator, an extent estimator, a subtractor, a controller, and a transmission signal estimator. The main frequency offset estimator determines the reception signal for the $u^{th}$ user or a feedback signal as a selection signal in response to a first control signal, estimates the frequency offset from the selection signal, and outputs the estimated frequency offset. The extent estimator estimates multiple access interferences representing an extent to which reception signals for from $i^{th}$ other users ($1 \leq i \leq U-1$) interfere with the reception signal for the $u^{th}$ user, from the reception signals for the $i^{th}$ other users, the selection signal, and the estimated frequency offset, and outputs the estimated multiple access interferences. The subtractor subtracts the estimated interferences from the reception signal for the $u^{th}$ user and outputs the subtraction result as the feedback signal. The controller generates the first control signal in response to the result obtained by analyzing the state of the apparatus for compensating for the frequency offset, checks whether a predetermined period of time has elapsed, and outputs a second control signal in response to the checked result. The transmission signal estimator estimates the transmission signal for the $u^{th}$ user from the feedback signal finally input from the subtractor and the estimated frequency offset in response to the second control signal and outputs the estimated transmission signal. It is preferable that the main frequency offset estimator, the extent estimator, and the subtractor are enabled in response to the second control signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method of compensating for frequency offset in an IFDMA according to the present invention will be described with reference to the attached drawings.

Figure 1:
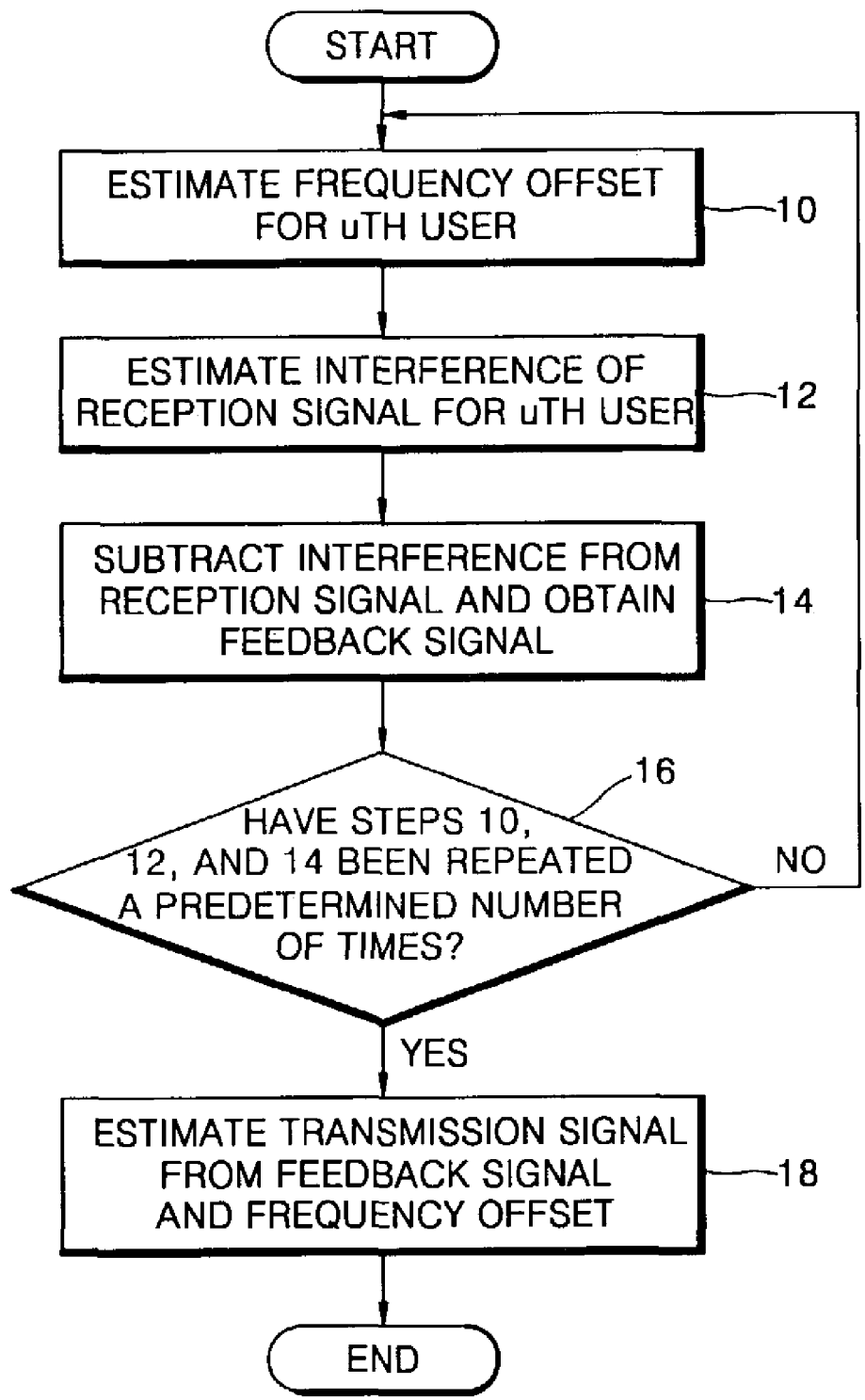
FIG. 1 is a flowchart for explaining a method of compensating for the frequency offset in an IFDMA according to the present invention.

FIG. 1 is a flowchart for explaining a method of compensating for frequency offset in an IFDMA according to the present invention. The method is composed of steps 10 and 12 of estimating a frequency offset and an interference, step 14 of obtaining a feedback signal, and step 16 and 18 of estimating a transmission signal.

During IFDMA communications, the frequency offset compensating method according to the present invention shown in FIG. 1 is used to compensate for a frequency offset between a transmission signal and a reception signal for a $u^{th}$ user (1 u U, where U denotes the number of users) and estimates a transmission signal from a reception signal. Here, the frequency offset is caused by a difference between oscillation frequencies generated by a transmission oscillator used in a transmitter to generate the transmission signal and a reception oscillator used in a receiver to generate the reception signal.

The frequency offset compensating method according to the present invention performs step 10 of estimating a frequency offset $\hat{\epsilon}_u$ for the $u^{th}$ user from a selection signal. Here, a signal received in an initial mode where the frequency offset compensating method according to the present invention starts is determined as the selection signal, and then a feedback signal is determined as the selection signal in a normal mode. The frequency offset $\hat{\epsilon}_u$ can be estimated from the selection signal using Equation 1:

$$\hat{\epsilon}_u = \frac{\angle C_u}{2\pi} \quad (1)$$

wherein $$|\hat{\epsilon}_u| < \frac{1}{2},$$

and $\angle C_u$, denotes the angle of a correlation value $C_u$ which can be calculated using Equation 2:

$$C_u = \sum_{k=1}^{N_u-1} \widehat{z}_{k+N}^{(u)[u]} \left( \widehat{z}_k^{(u)[u]} \right)^* \quad (2)$$

wherein $N_u$ denotes the number of carriers used by the $u^{th}$ user, k (k=0, 1, . . . , $N_u$–1) denotes the position of the reception signal for the $u^{th}$ user among a plurality of reception signals contained in a frame, N denotes the number of chips constituting a block, $$\widehat{z}_{k+N}^{(u)[u]}$$

denotes the result obtained by delaying the selection signal $$\widehat{z}_k^{(u)[u]}$$

by N, and $$\left( \widehat{z}_k^{(u)[u]} \right)^*$$

denotes a conjugate of the selection signal $$\widehat{z}_k^{(u)[u]}.$$

Here, the selection signal $$\widehat{z}_k^{(u)[u]}$$

is determined as the reception signal for the $u^{th}$ user in the initial mode and expressed by Equation 3:

$$r_k^{[u]} = z_k^{(u)[u]} + \sum_{i=1, i \neq u}^{U} z_k^{(i)[u]} + n_k^{[u]} \quad (3)$$

wherein $r_k^{[u]}$ denotes the reception signal for the $u^{th}$ user, $n_k^{[u]}$ denotes noise components contained in the reception signal $r_k^{[u]}$ for the $u^{th}$ user, and $z_k^{(i)[u]}$ denotes the extent by which the reception signals for $i^{th}$ (1 i U–1) other users interfere with the reception signal $r_k^{[u]}$ for the $u^{th}$ user.

After step 10, the reception signals for the $i^{th}$ users interfere with the reception signal $r_k^{[u]}$ for the $u^{th}$ user is estimated in step 12. Here, a multiple access interference $$\widehat{z}_k^{(i)[u]}$$

indicating the extent by which one of the $i^{th}$ users interferes with the $u^{th}$ user can be estimated using Equation 4:

$$\widehat{z}_k^{(i)[u]} = \begin{cases} e^{j\pi[\Delta_{iu}(2k/N-1/L_u)+\hat{\varepsilon}_i(1/L_i-1/L_u)]} \dfrac{q_i \sin(\pi\hat{\varepsilon}_i/L_i)}{L_i \sin[\pi(\Delta_{iu}+\hat{\varepsilon}_i)/L_u]} \cdot \\ \widehat{z}_{k\%N_i}^{(i)[i]}, \text{ for } N_i \leq N_u \\ e^{j\pi[\Delta_{iu}(2k/N-1/L_i)]} \dfrac{q_i \sin(\pi\hat{\varepsilon}_i/L_i)}{L_i \sin[\pi(\Delta_{iu}+\hat{\varepsilon}_i)/L_i]} \cdot \sum_{I=0}^{M_{iu}-1} \\ e^{j2\pi(\Delta_{iu}+\hat{\varepsilon}_i)I/L_u} \widehat{z}_{k+IN_u}^{(i)[i]}, \text{ for } N_i > N_u \end{cases} \quad (4)$$

wherein $$\widehat{z}_k^{(i)[u]}$$

denotes an estimated value of the multiple access interference $$(\widehat{z}_k^{(i)[u]}),$$

$_{iu}$ denotes $n_i - n_u$, $n_i$ denotes a frequency offset assigned to the $i^{th}$ user, $n_u$ denotes a frequency offset assigned to the $u^{th}$ user, $L_u$ denotes the number of times user symbols are repeated in a transmitter for the $u^{th}$ user, $L_i$ denotes the number of times user symbols are repeated in a transmitter for the $i^{th}$ user, $\hat{\varepsilon}_i$ denotes a frequency offset of the reception signal for the $i^{th}$ user, $q_i$ denotes an initial phase offset of an $i^{th}$ block, $k \% N_i$ denotes the remainder when k is divided by $N_i$, $N_i$ denotes the number of carriers used by the $i^{th}$ user, and $$M_{iu} = \frac{N_i}{N_u} = \frac{L_u}{L_i}.$$

Here, the frequency offsets $n_i$ and $n_u$ are different from the frequency offset to be compensated for according to the present invention.

Accordingly, the sum of multiple access interferences $$\widehat{z}_k^{(i)[u]}$$

that is, the extent by which the reception signals for U users, from which the reception signal for the $u^{th}$ user is excluded, interfere with the reception signal for the $u^{th}$ user can be determined as a total interference and be expressed by Equation 5:

$$\sum_{i=1, i \neq u}^{U} \widehat{z}_k^{(i)[u]} \quad (5)$$

After step 12, in step 14, the interference is subtracted from the reception signal $r_k^{[u]}$ for the $u^{th}$ user using Equation 6, and then the subtraction result is determined as a feedback signal $$\widehat{z}_k^{(u)[u]}$$

that can be the selection signal in the normal mode as previously described.

$$\widehat{z}_k^{(u)[u]} = r_k^{[u]} - \sum_{i=1, i \neq u}^{U} \widehat{z}_k^{(i)[u]} \quad (6)$$

After step 14, in step 16, whether steps 10, 12, and 14 have been repeated a predetermined number of times is determined. Here, the predetermined number of times is determined in proportion to a reduction rate of SNR. In other words, the predetermined number of times can be increased with a reduction in the SNR.

If it is determined that steps 10, 12, and 14 have not been repeated a predetermined number of times, the process goes to step 10, and then steps 10, 12, and 14 are repeated. Here, in the frequency offset compensating method according to the present invention, a selection signal when step 10 is initially performed is determined as a reception signal, while a selection signal selected when step 10 is repeated is determined as a feedback signal not as a reception signal. However, if in step 16 it is determined that steps 10, 12, and 14 have been repeated the predetermined number of times, in step 18 a transmission signal $y_k^{[u]}$ is estimated from a feedback signal $$\widehat{z}_k^{(u)[u]}$$

that is finally determined in step 14 and a frequency offset $\hat{\varepsilon}_u$ that is finally determined in step 10, and then the estimated transmission signal $$\widehat{y}_k^{[u]}$$

is obtained using Equation 7:

$$\widehat{y}_k^{[u]} = e^{-j\pi[\Delta_{iu}(2k/N-1/L_u)+1]} \frac{L_u \sin(\pi\hat{\varepsilon}_u/L_u)}{\hat{q}_u \sin(\pi\hat{\varepsilon}_u)} \widehat{z}_k^{(u)[u]} \quad (7)$$

wherein $q_u$ denotes an initial phase offset in a $u^{th}$ block and $\hat{q}_u$ denotes an estimation value of the initial phase offset $q_u$.

The structure and operation of an IFDMA communication device having a frequency offset compensating apparatus, according to the present invention, for performing the method of compensating for the frequency offset in an IFDMA according to the present invention will be described with reference to the attached drawings.

Figure 2:
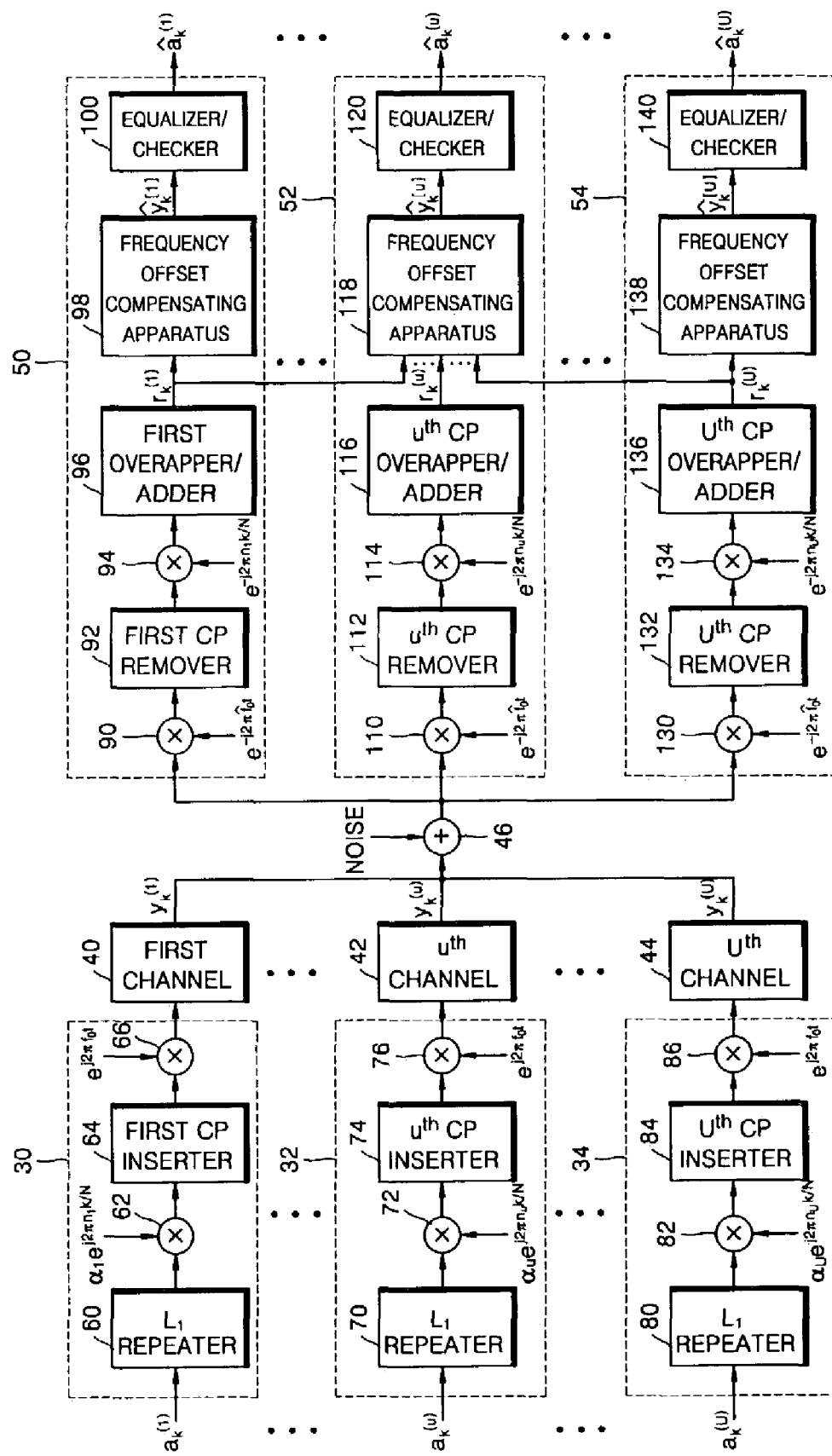
FIG. 2 is a block diagram of an IFDMA communication device having a frequency offset compensating apparatus according to the present invention.

FIG. 2 is a block diagram of an IFDMA communication device having a frequency offset compensating apparatus according to the present invention. Referring to FIG. 2, the IFDMA communication device includes first, ..., $u^{th}$, ..., and $U^{th}$ transmitters 30, ..., 32, ..., and 34 for first through $U^{th}$ users, first, ..., $u^{th}$, ..., and $U^{th}$ channels 40, ..., 42, ..., and 44, an adder 46, and first, ..., $u^{th}$, ..., and $U^{th}$ receivers 50, ..., 52, ..., and 54 for the first through $U^{th}$ users.

The first transmitter 30 shown in FIG. 2 includes a $L_1$ repeater 60, a multiplier 62, a first cycle prefix (CP) inserter 64, and a multiplier 66. The $u^{th}$ transmitter 32 includes an $L_u$ repeater 70, a multiplier 72, an $u^{th}$ CP inserter 74, and a multiplier 76. The $U^{th}$ transmitter 34 includes a $L_u$ repeater 80, a multiplier 82, a $U^{th}$ CP inserter 84, and a multiplier 86.

Here, the $L_1$ repeater 60 repeats a user symbol $\alpha_k^{(1)}$ for the first user $L_1$ times and then outputs the repeated user symbol to the multiplier 62. The $L_u$ repeater 70 repeats a user symbol $\alpha_k^{(u)}$ for the $u^{th}$ user $L_u$ times and then outputs the repeated user symbol to the multiplier 72. The $L_u$ repeater 80 repeats a user symbol $\alpha_k^{(U)}$ for the $U^{th}$ user $L_U$ times and then outputs the repeated user symbol to the multiplier 82. Here, the user symbol $\alpha_k^{(1)}$ is composed of $N_1$ quadrature amplitude modulation (QAM) encoded signals, the user symbol $\alpha_k^{(u)}$ is composed of $N_u$ QAM encoded signals, and the user symbol $\alpha_k^{(U)}$ is composed of $N_U$ QAM encoded signals.

The multipliers 62, 72, and 82 respectively multiply the repetition results output from the $L_1$, $L_u$, and $L_U$ repeaters 60, 70, and 80 by $$\alpha_1 e^{\frac{j2\pi n_1 k}{N}},$$

$$\alpha_u e^{\frac{j2\pi n_u k}{N}},$$

and $$\alpha_U e^{\frac{j2\pi n_U k}{N}}$$

and then output the multiplication results to the first, $u^{th}$, and $U^{th}$ CP inserters 64, 74, and 84.

The first, $u^{th}$, or $U^{th}$ CP inserter 64, 74, or 84 removes interferences among blocks, inserts a CP before the multiplication result output from the multiplier 62, 72, or 82, and outputs the insertion result to the multiplier 66, 76, or 86.

In order to convert the insertion results into an RF signal, the multipliers 66, 76, and 86 multiply the insertion results output from the first, $u^{th}$, and $U^{th}$ CP inserter 64, 74, and 84 by $e^{j2\pi f_0 t}$ and then output the multiplication results to the first, ... $u^{th}$, ..., and $U^{th}$ channels 40, ..., 42, ..., and 44 Transmission signals $y_k^{(1)}$, ..., $y_k^{(u)}$, ..., and $y_k^{(U)}$ that have passed through the first, ... $u^{th}$, ..., and $U^{th}$ channels 40, ..., 42, ..., and 44 are added and then the addition result is added to noise by the adder 46. Here, the adder 46 is not an actually existing device but is shown to conceptionally explain that noise factors into the addition result.

The first receiver 50 shown in FIG. 2 includes a multiplier 90, a first CP remover 92, a multiplier 94, a first overlapper/adder 96, a frequency offset compensating apparatus 98, and a first equalizer and checker 100. The $u^{th}$ receiver 52 includes a multiplier 110, an $u^{th}$ CP remover 112, a multiplier 114, an $u^{th}$ overlapper/adder 116, a frequency offset compensating apparatus 118, and an $u^{th}$ equalizer and checker 120. The $U^{th}$ receiver 54 includes a multiplier 130, an $U^{th}$ CP remover 132, a multiplier 134, an $U^{th}$ overlapper/adder 136, a frequency offset compensating apparatus 138, and an $U^{th}$ equalizer and checker 140.

In order to convert the RF signal, i.e., the addition result, into a base band signal, the multipliers 90, 110, and 130 multiply the addition result obtained by the adder 46 by $e^{-j2\pi \hat{f}_0 t}$ and then output the multiplication results to the first, $u^{th}$, and $U^{th}$ CP removers 92, 112, and 132, respectively. Here, a difference between a frequency $f_0$ generated by the transmission oscillator and a frequency $\hat{f}_0$ generated by the reception oscillator corresponds to the frequency offset that is to be compensated for according to the present invention.

Here, the first, $u^{th}$, and $U^{th}$ CP remover 92, 112, or 132 removes a CP from the multiplication result obtained by the multiplier 90, 110, or 130 and then outputs the removal result to the multiplier 94, 114, or 134. The multipliers 94, 114, and 134 multiply the removal results output from the first, $u^{th}$, and $U^{th}$ CP removers 92, 112, and 132 by $$e^{\frac{-j2\pi n_1 k}{N}},$$

$$e^{\frac{-j2\pi n_u k}{N}},$$

and $$e^{\frac{-j2\pi n_U k}{N}}$$

and then output the multiplication results to the first, $u^{th}$, and $U^{th}$ overlappers/adders 96, 116, and 136.

The first, $u^{th}$, and $U^{th}$ overlappers/adders 96, 116, and 136 overlap the multiplication results output from the multipliers 94, 114, and 134 for $N_1$, $N_u$, and $N_U$ cycles, add the overlap results, and output the addition results to the frequency offset compensating apparatuses 98, 118, and 138. For example, the $u^{th}$ overlapper/adder 116 may output the reception signal $r_k^{(u)}$ calculated using equation 3 to the frequency offset compensating apparatus 118.

The frequency offset compensating apparatus 98, 118, or 138 shown in FIG. 2 performs the frequency offset compensating method according to the present invention shown in FIG. 1 to estimate the transmission signal $y_k^{(1)}$, $y_k^{(u)}$, or $y_k^{(U)}$, and to output the estimated transmission signal $$\hat{y}_k^{[1]}, \hat{y}_k^{[u]},$$

or $$\hat{y}_k^{[U]}]$$

to the first, $u^{th}$, or $U^{th}$ equalizer and checker 100, 120, or 140.

The first, $u^{th}$, and $U^{th}$ equalizer and checkers 100, 120, and 140 equalize the estimated transmission signals $$\hat{y}_k^{[1]}, \hat{y}_k^{[u]},$$

and $$\hat{y}_k^{[U]}$$

that are output from the frequency offset compensating apparatuses 98, 118, and 138 and have inter-symbol interferences (ISIs) caused by the first, . . . , $u^{th}$, . . . , and $U^{th}$ channels 40, . . . , 42, . . . , and 44 to remove the ISIs from the estimated transmissions signals $$\hat{y}_k^{[1]}, \hat{y}_k^{[u]},$$

and $$\hat{y}_k^{[U]},$$

estimate the user symbols $\alpha_k^{(1)}$, $\alpha_k^{(u)}$, and $\alpha_k^{(U)}$, and output estimated user symbols $$\hat{a}_k^{(1)}, \hat{a}_k^{(U)},$$

and $$\hat{a}_k^{(1)}.$$

The structure and operation of the frequency offset compensating apparatus 118 for performing the method of compensating for frequency offset in an IFDMA according to the present invention will be described with reference to the attached drawings. Here, the frequency offset compensating apparatuses 98 and 138 shown in FIG. 2 have the same structure and perform the same operation as the frequency offset compensating apparatus 118.

Figure 3:
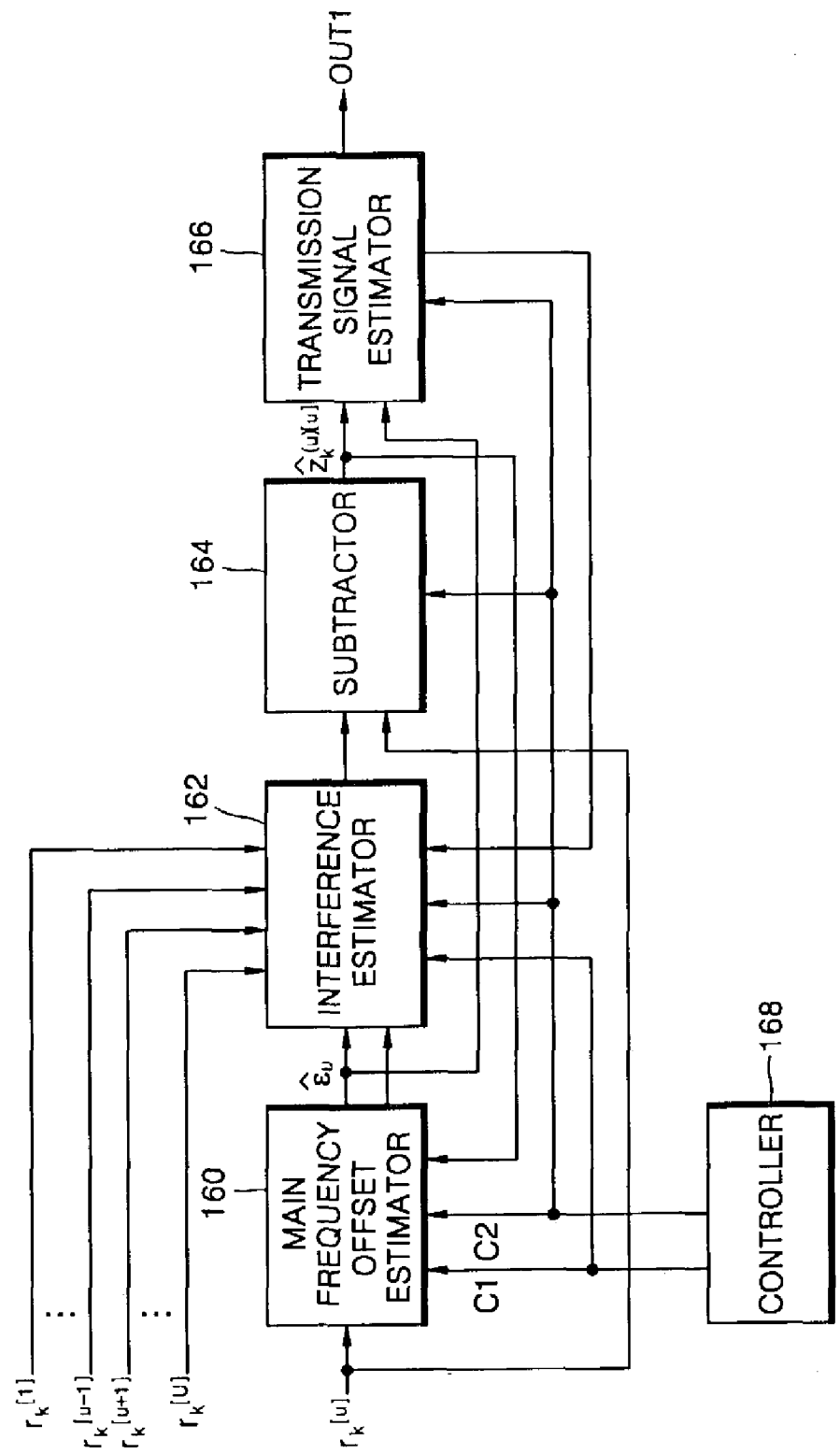
FIG. 3 is a block diagram of the frequency offset compensating apparatus according to the present invention.

FIG. 3 is a block diagram of the frequency offset compensating apparatus according to the present invention. The frequency offset compensating apparatus includes a main frequency offset estimator 160, an interference estimator 162, a subtractor 164, a transmission signal estimator 166, and a controller 168.

In order to carry out step 10 of FIG. 1 the main frequency offset estimator 160 shown in FIG. 3 determines the reception signal $r_k^{[u]}$ and the feedback signal $z_k^{(\tilde{u})[\tilde{u}]}$ as the selection signal in response to a first control signal C1 input from the controller 168, estimates the frequency offset $\hat{\epsilon}_{\tilde{u}}$ of the $u^{th}$ user from the selection signal as expressed by Equation 1, and outputs the estimated frequency offset $\hat{\epsilon}_{\tilde{u}}$ to the interference estimator 162 and the transmission signal estimator 166. For this, the controller 168 generates the first control signal C1 in response to the result obtained by analyzing the state of the frequency offset compensating apparatus shown in FIG. 3 and then outputs the first control signal C1 to the main frequency offset estimator 160. For example, the controller 168 generates the first control signal C1 and then outputs the first control signal C1 to the frequency offset estimator 160, so that the main frequency offset estimator 160 determines the reception signal $r_k^{[u]}$ when the frequency offset compensating apparatus shown in FIG. 3 is in the initial mode as the selection signal and then determines the feedback signal $z_k^{(\tilde{u})[\tilde{u}]}$ when the frequency offset compensating apparatus is in the normal mode as the selection signal.

Figure 4:
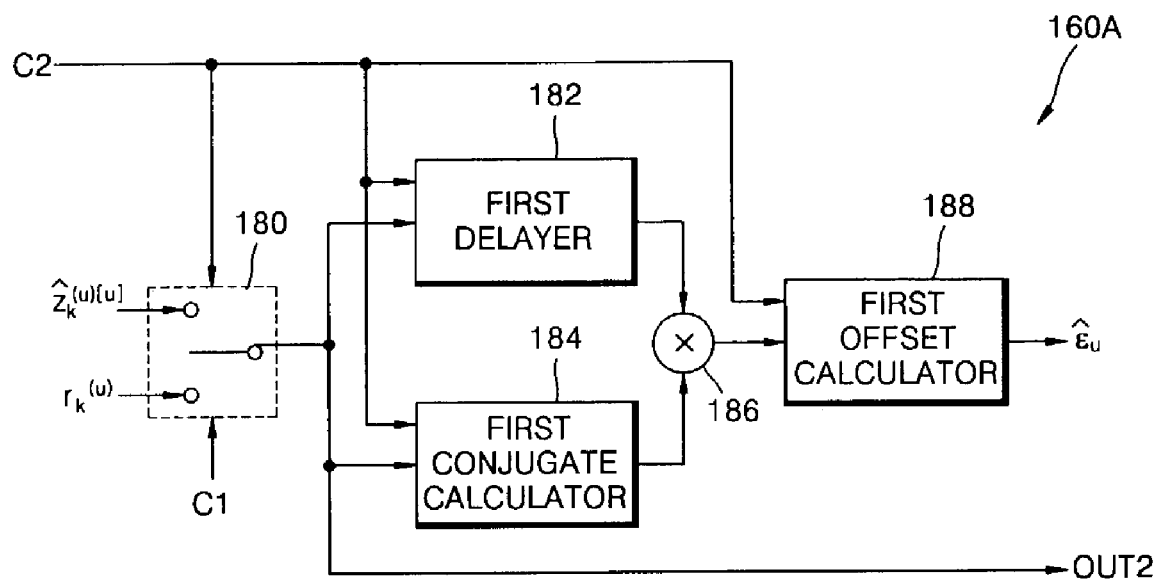
FIG. 4 is a block diagram of a preferred embodiment of the present invention of a main frequency offset estimator shown in FIG. 3.

FIG. 4 is a block diagram of a preferred embodiment 160A of the present invention of the main frequency offset estimator 160 shown in FIG. 3. The main frequency offset estimator 160A includes a first selector 180, a first delayer 182, a first conjugate calculator 184, a first multiplier 186, and a first offset calculator 188.

The first selector 180 of the main frequency offset estimator 160A shown in FIG. 4 selects one of the feedback signal $z_k^{(\tilde{u})[\tilde{u}]}$ input from the subtractor 164 and the reception signal $r_k^{[u]}$ input from the outside in response to the first control signal C1 input from the controller 168 and then outputs the selection result as the selection signal to the first delayer 182 and the first conjugate calculator 184 as well as via an output port OUT2. For example, the first selector 180 determines the reception signal $r_k^{[u]}$ from input from the outside as the selection signal and then outputs the selection signal if it is determined through the first control signal C1 input from the controller 168 that the frequency offset compensating apparatus shown in FIG. 3 is in the initial mode. The first selector 180 also determines the feedback signal $z_k^{(\tilde{u})[\tilde{u}]}$ input from the subtractor 164 as the selection signal and then outputs the selection signal if it is determined through the first control signal C1 that the frequency offset compensating apparatus is in the normal mode.

The first delayer 182 delays the selection signal input from the first selector 180 by a unit block N and then outputs the delayed selection signal to the first multiplier 186. Here, the first conjugate calculator 184 calculates a conjugate of the selection signal input from the first selector 180 and then outputs the conjugate of the selection signal to the first multiplier 186.

The first multiplier 186 multiplies the conjugate of the selection signal input from the first conjugate calculator 184 by the delayed selection signal input from the first delayer 182 and then outputs the multiplication result to the first offset calculator 188.

The first offset calculator 188 accumulates the multiplication result input from the first multiplier 186 by $N_u - 1$ that is one less than the number $N_u$ of carriers used by the $u^{th}$ user, calculates an angle $\angle C_u$ of the accumulation result, divides the angle $\angle C_u$ by $2\pi$ as shown in Equation 1, and outputs the division result as the estimated frequency offset $\hat{\epsilon}_{\hat{u}}$.

The first selector 180, the first delayer 182, the first conjugate calculator 184, the first multiplier 186, and the first offset calculator 188 shown in FIG. 4 are enabled in response to a second control signal C2 input from the controller 168. Here, in order to perform step 16 of FIG. 1, the controller 168 checks whether a predetermined period of time has elapsed and then outputs the second control signal C2 in response to the checked result. Here, the elapse of the period of time elapses indicates that steps 10, 12, and 14 are repeated the predetermined number of times. Accordingly, when it is perceived through the second control signal that the predetermined period of time has not elapsed, the first selector 180, the first delayer 182, the first conjugate calculator 184, the first multiplexer 186, and the first offset calculator 188 are enabled.

In order to perform step 12, the interference estimator 162 estimates multiple access interferences (as calculated using Equation 5) which represents the extent to which the reception signals $r_k^{[1]}, \ldots, r_k^{[u-1]}, r_k^{[u+1]}, \ldots$ and $r_k^{[U]}$ for the $i^{th}$ users interfere with the reception signal $r_k^{[u]}$ for the $u^{th}$ user, from the reception signals $r_k^{[1]}, \ldots, r_k^{[u-1]}, r_k^{[u+1]}, \ldots$ and $r_k^{[U]}$ for other users, the selection signal output from the first selector 180 shown in FIG. 4, and the estimated frequency offset $\hat{\epsilon}_{\hat{u}}$, and then outputs the estimated multiple access interferences to the subtractor 164.

To carry out step 14, the subtractor 164 subtracts the estimated multiple access interferences from the reception signal $r_k^{[u]}$ using equation 6 and then outputs the subtraction result as the feedback signal $$\hat{z}_k^{(u)[u]}$$

to the main frequency offset estimator 160 and the transmission signal estimator 166.

In order to perform step 18, the transmission signal estimator 166 estimates a transmission signal from the feedback signal $$\hat{z}_k^{(u)[u]}$$

finally input from the subtractor 164 and the estimated frequency offset $$\hat{\varepsilon}_u$$

input from the main frequency offset estimator 160 using Equation 7 in response to the second control signal C2 generated by the controller 168, and then outputs the estimated transmission signal $$\hat{y}_k^{[u]}$$

via an output port OUT1. For example, if the transmission signal estimator 166 perceives through the second control signal C2 that the predetermined period of time has elapsed, the transmission signal estimator 166 performs an operation to estimate the transmission signal $$\hat{y}_k^{[u]}.$$

Here, the interference estimator 162 and the subtractor 164 also operate in response to the second control signal C2 generated by the controller 168. In other words, if the interference estimator 162 and the subtractor 164 perceive through the second control signal C2 that the predetermined period of time has elapsed, they are enabled.

The structure and operation of preferred embodiments of the present invention of the transmission signal estimator 166 and the interference estimator 162 shown in FIG. 3 will be described with reference to FIGS. 5 and 6.

Figure 5:
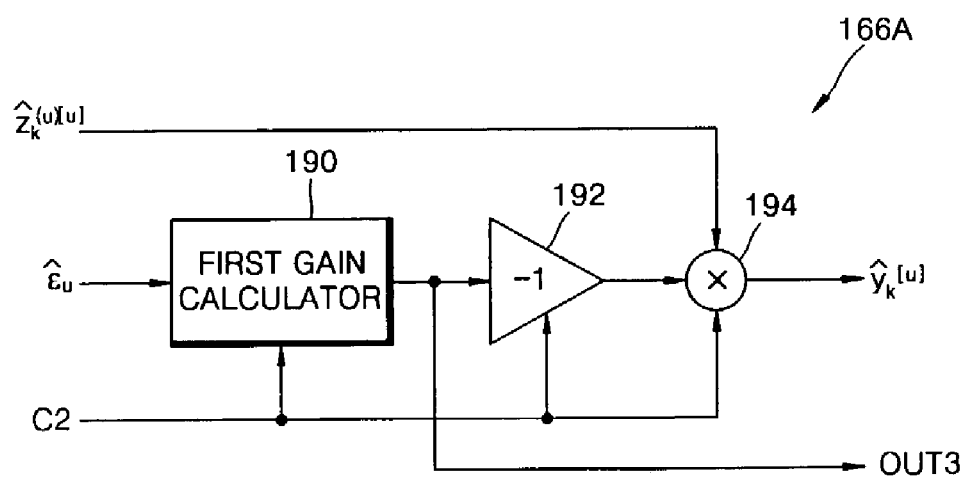
FIG. 5 is a block diagram of a preferred embodiment of the present invention of a transmission signal estimator shown in FIG. 3.

FIG. 5 is a block diagram of a preferred embodiment 166A of the present invention of the transmission signal estimator 166 shown in FIG. 3. The transmission signal estimator 166A includes a first gain calculator 190, an inverter 192, and a second multiplier 194.

The first gain calculator 190 of the transmission signal estimator 166A shown in FIG. 5 calculates a gain from the estimated frequency offset $\hat{\epsilon}_{\hat{u}}$ input from the main frequency offset estimator 160 using Equation 8 and then outputs the calculation result as a first gain to the inverter 192.

$$-e^{-j\pi[\Delta_u(2k/N-1/L_u)+1]} \frac{L_u \sin(\pi \hat{\epsilon}_u / L_u)}{\hat{q}_u \sin(\pi \hat{\epsilon}_u)} \qquad (8)$$

Here, the inverter 192 inverts the first gain input from the first gain calculator 190 and then outputs the inversion result to the second multiplier 194. The second multiplier 194 multiply the first gain inverted by the inverter 192 by the feedback signal $$\hat{z}_k^{(u)[u]}$$

finally input from the subtractor 164 and then outputs the multiplication result as the estimated transmission signal $$\hat{y}_k^{[u]}.$$

The first gain calculator 190, the inverter 192, and the second multiplier 194 shown in FIG. 5 are enabled in response to the second control signal C2 input from the controller 168. For example, if the first gain calculator 190, the inverter 192, and the second multiplier 194 perceive through the second control signal C2 that the predetermined period of time has elapsed, they are enabled.

Figure 6:
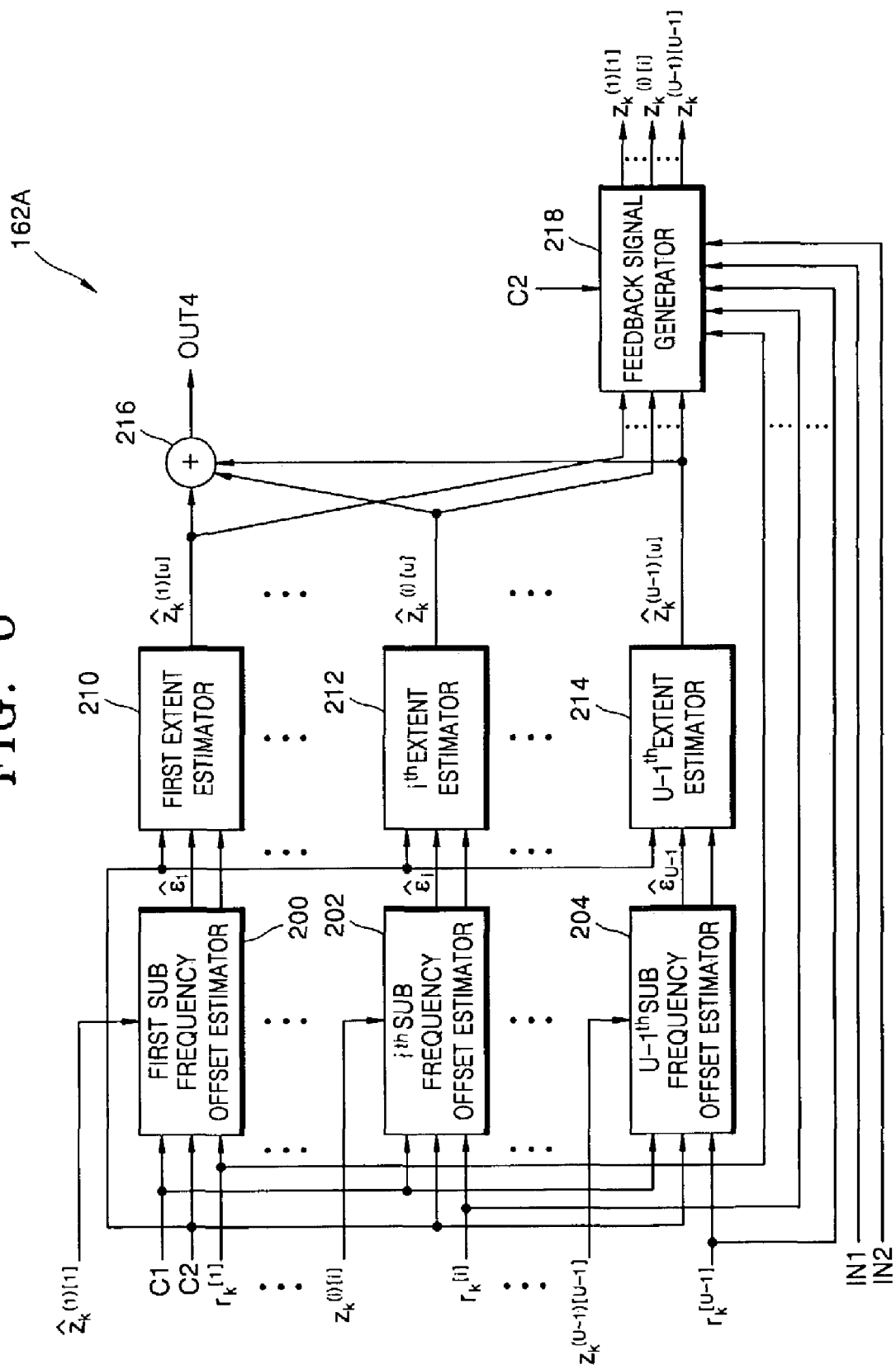
FIG. 6 is a block diagram of a preferred embodiment of the present invention of an extent estimator shown in FIG. 3.

FIG. 6 is a block diagram of a preferred embodiment 162A of the present invention of the interference estimator 162 shown in FIG. 3. The interference estimator 162A includes first, ..., $i^{th}$, ..., and U-$1^{th}$ sub frequency offset estimators 200, ..., 202, ..., and 204, first, ..., $i^{th}$, ..., and U-$1^{th}$ extent estimators 210, ..., 212, ..., and 214, an adder 216, and a feedback signal generator 218.

The $i^{th}$ sub frequency offset estimator 202 of the first, ..., $i^{th}$, ..., and U-$1^{th}$ sub frequency offset estimators 200, ..., 202, ..., and 204 selects a feedback signal $Z_k^{(i)[i]}$ for the $i^{th}$ user or the reception signal $r_k^{[i]}$ for the $i^{th}$ user in response to the first control signal C1 input from the controller 168, estimates a frequency offset for the $i^{th}$ other user from the selected result, and outputs the estimated frequency offset $\hat{\epsilon}_{\hat{i}}$ to the $i^{th}$ extent estimator 212. Here, the frequency offset is calculated using Equations 1 and 2. In this case, i can be substituted for u in Equations 1 and 2.

For example, the first sub frequency offset estimator 200 selects a feedback signal $Z_k^{(1)[1]}$ for a first other user or the reception signal $r_k^{[1]}$ for the first other user in response to the first control signal C1 input from the controller 168, estimates a frequency offset for the first other user from the selected result, and outputs the estimated frequency offset signal $\hat{\epsilon}_{\hat{1}}$ to the first extent estimator 210. The U-$1^{th}$ sub frequency offset estimator 204 selects a feedback signal $Z_k^{(U-1)[U-1]}$ for a U-$1^{th}$ user or the reception signal $r_k^{[U-1]}$ for U-$1^{th}$ other user in response to the first control signal C1 input from the controller 168, estimates a frequency offset for the U-$1^{th}$ other user from the selected result, and outputs the estimated frequency offset $\hat{\epsilon}_{\widehat{U-1}}$ to the U-$1^{th}$ extent estimator 214.

Figure 7:
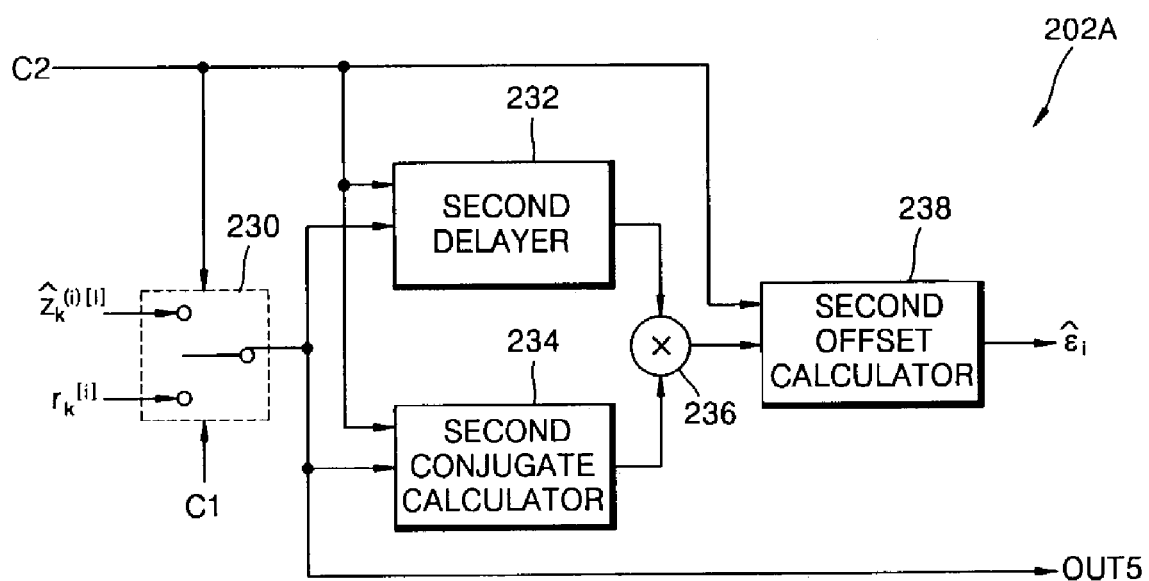
FIG. 7 is a block diagram of a preferred embodiment of the present invention of an $i^{th}$ sub frequency offset estimator shown in FIG. 6.

FIG. 7 is a block diagram of a preferred embodiment 202A of the present invention of the $i^{th}$ sub frequency offset estimator 202 shown in FIG. 6. The $i^{th}$ sub frequency offset estimator 202A includes a second selector 230, a second delayer 232, a second conjugate calculator 234, a third multiplier 236, and a second offset calculator 238.

The second selector 230 shown in FIG. 7 selects one of a feedback signal $$\hat{z}_k^{(i)[i]}$$

for the $i^{th}$ other user and the reception signal $r_k^{[i]}$ input from the outside in response to the first control signal C1 and then outputs the selected result to the second delayer 232 and the second conjugate calculator 234 and to the $i^{th}$ extent estimator 212 via an output port OUT5. For example, if the second selector 230 perceives through the first control signal C1 that the frequency offset compensating apparatus is in the initial mode, the second selector 230 selects the reception signal $r_k^{[i]}$ for the $i^{th}$ other user. However, if the second selector 230 perceives through the first control signal C1 that the frequency offset compensating apparatus is in the normal mode, the second selector 230 selects the feedback signal $$\hat{z}_k^{(i)[i]}$$

for the $i^{th}$ other user.

The second delayer 232 delays the selected result input from the second selector 230 by a unit block N and then outputs the delayed result to the third multiplier 236. The second conjugate calculator 234 calculates a conjugate of the selected result input from the second selector 230 and then outputs the calculation result to the third multiplier 236. The third multiplier 236 multiplies the calculation result input from the second conjugate calculator 234 by the delayed result input from the second delayer 232 and then outputs the multiplication result to the second offset calculator 238.

The second offset calculator 238 accumulates the multiplication result input from the third multiplier 236 by $N_i-1$ that is one less than the number $N_i$ of carriers used by the $i^{th}$ other user, calculates an angle $\angle C_i$ of the accumulation result, divides the angle $\angle C_i$ by a predetermined number, e.g., $2\pi$, and outputs the division result as the estimated frequency offset $\hat{\epsilon}_{\hat{i}}$ for the $i^{th}$ other user.

The first, ..., $i^{th}$, ..., and U-$1^{th}$ extent estimators 210, ..., 212, ..., and 214 estimate first, ..., $i^{th}$, ..., and U-$1^{th}$ interferences and then output the estimated first, ..., $i^{th}$, ..., and U-$1^{th}$ interferences $$\hat{z}_k^{(1)[u]}, \ldots, \hat{z}_k^{(i)[u]}, \ldots, \text{and } \hat{z}_k^{(U-1)[u]}$$

to the adder 216 and the feedback signal generator 218. For example, the $i^{th}$ extent estimator 212 of the first, ..., $i^{th}$, ..., and U-$1^{th}$ extent estimators 210, ..., 212, ..., and 214 estimates a $i^{th}$ interference $$\hat{z}_k^{(i)[u]}$$

corresponding to the extent to which the reception signal $r_k^{[i]}$ for the $i^{th}$ other user interferes with the reception signal $r_k^{[u]}$ for the $u^{th}$ user, from the frequency offset $\hat{\epsilon}_{\hat{i}}$ of the signal $r_k^{[i]}$ for the $i^{th}$ other user and the result selected by the $i^{th}$ sub frequency offset estimator 202, e.g., the selection result output from the second selector 230 of the $i^{th}$ sub frequency offset estimator 202A shown in FIG. 7 via the output port OUT5, and then outputs the estimation result $$\hat{z}_k^{(i)[u]}$$

to the adder 216 and the feedback signal generator 218. The first extent estimator 210 estimates a first interference $$\hat{z}_k^{(i)[u]}$$

corresponding to the extent to which the reception signal $r_k^{[1]}$ for the first other user interfere with the reception signal $r_k^{[u]}$ for the $u^{th}$ user, from the frequency offset $\hat{\epsilon}_{\hat{1}}$ for the first other user and the result selected by the first sub frequency offset estimator 200, and then outputs the estimation result $$\hat{z}_k^{(i)[u]}$$

to the adder 216 and the feedback signal generator 218. The U−1$^{th}$ extent estimator 214 estimates a U−1$^{th}$ interference $$\hat{z}_k^{(U-1)[u]}$$

corresponding to the extent to which a reception signal $r_k^{[U-1]}$ for a U−1$^{th}$ other user interfere with the reception signal $r_k^{[u]}$ for the u$^{th}$ user, from a frequency offset $\hat{\epsilon}_{U-1}$ for the U−1$^{th}$ other user and the result selected by the U−1$^{th}$ sub frequency offset estimator 204, and then outputs the estimation result $$\hat{z}_k^{(U-1)[u]}$$

to the adder 216 and the feedback signal generator 218.

Figure 8:
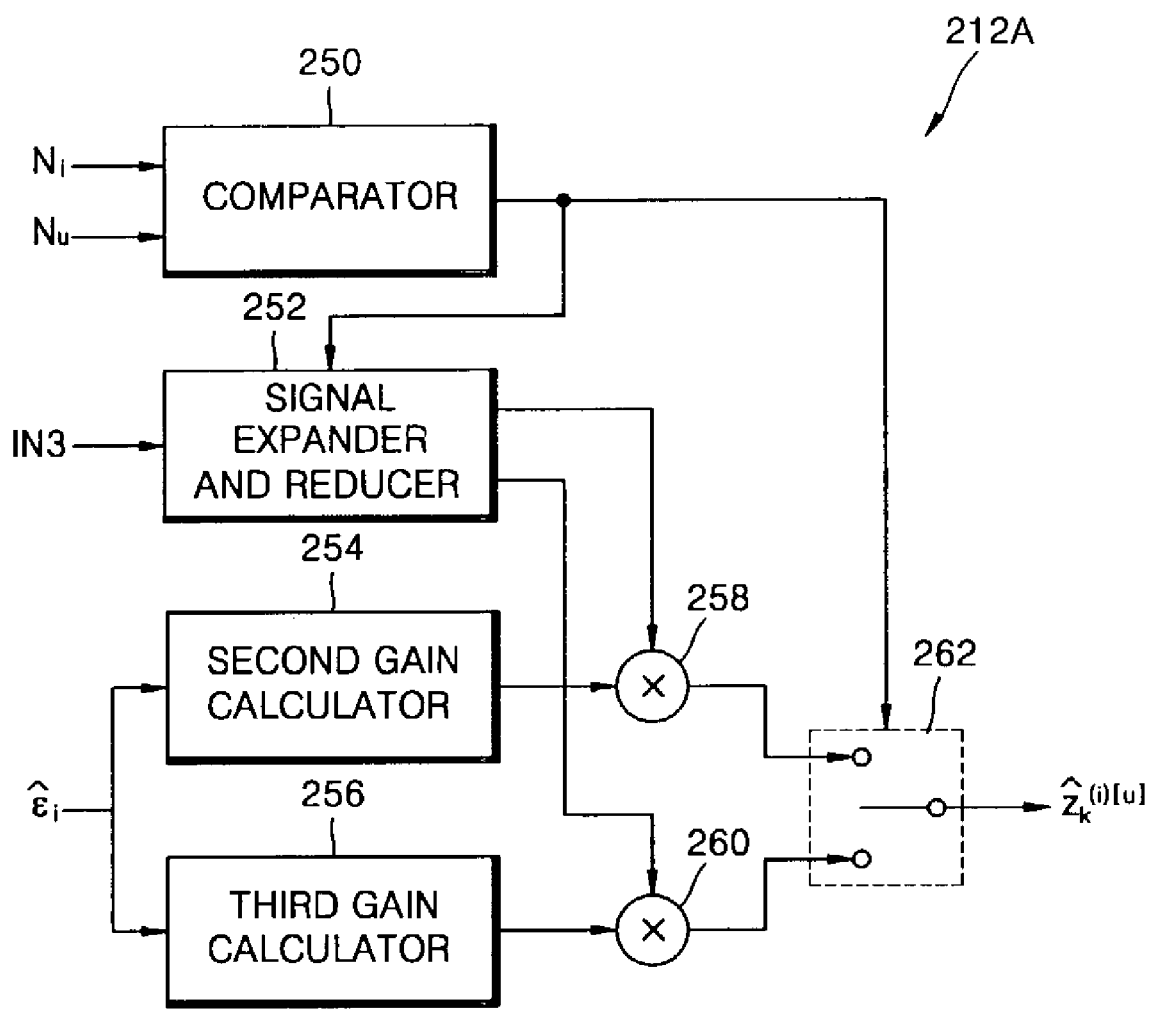
FIG. 8 is a block diagram of a preferred embodiment of the present invention of an $i^{th}$ extent estimator shown in FIG. 6.

FIG. 8 is a block diagram of a preferred embodiment 212A of the present invention of the i$^{th}$ extent estimator 212 shown in FIG. 6. The i$^{th}$ extent estimator 212A includes a comparator 250, a signal expander and reducer 252, a second gain calculator 254, a third gain calculator 256, fourth and fifth multipliers 258 and 260, and a third selector 262.

The comparator 250 compares the number $N_u$ of subcarriers used by the u$^{th}$ user with the number $N_i$ of subcarriers used by the i$^{th}$ user and then outputs the comparison result to the third selector 262 and the signal expander and reducer 252. Here, the signal expander and reducer 252 expands or reduces the length of the selection result input from the second selector 230 via an input port IN3 in response to the comparison result input from the comparator 250. For example, if the signal expander and reducer 252 perceives through the comparison result input from the comparator 250 that the number $N_i$ of subcarriers used by the i$^{th}$ other user is less than the number $N_u$ of subcarriers used by the u$^{th}$ user, the signal expander and reducer 252 expands the length of the selection result $$\hat{z}_k^{(i)[i]}$$

input from the second selector 230 using Equation 9 below and then outputs the expansion result to the fourth multiplier 258.

$$\hat{z}_{k \% N_i}^{(i)[i]} \quad (9)$$

However, if the signal expander and reducer 252 perceives through the comparison result input from the comparator 250 that the number $N_i$ of subcarriers used by the i$^{th}$ other user is greater than the number $N_u$ of subcarriers used by the u$^{th}$ user, the signal expander and reducer 252 reduces the length of the selection result $$\hat{z}_k^{(i)[i]}$$

input from the second selector 230 using Equation 10 below and then outputs the reduction result to the fifth multiplier 260.

$$\sum_{l=0}^{M_{iu}-1} e^{j2\pi(\Delta_{iu}+\hat{\epsilon}_i)l/L_u} \hat{z}_{k+lN_u}^{(i)[i]} \quad (10)$$

The second gain calculator 254 calculates a gain from the frequency offset $\hat{\epsilon}_i$ for the i$^{th}$ other user and input from the i$^{th}$ sub frequency offset estimator 202 using Equation 11 below and then outputs the calculation result as a second gain to the fourth multiplier 258.

$$e^{j\pi[\Delta_{iu}(2k/N-1/L_u)+\hat{\epsilon}_i(1/L_1-1/L_u)]} \frac{q_i \sin(\pi\hat{\epsilon}_i/L_i)}{L_i \sin[\pi(\Delta_{iu}+\hat{\epsilon}_i)/L_u]} \quad (11)$$

The third gain calculator 256 calculates a gain from the frequency offset $\hat{\epsilon}_i$ for the i$^{th}$ other user and input from the i$^{th}$ sub frequency offset estimator 202 using Equation 12 below and then outputs the calculation result as a third gain to the fifth multiplier 260.

$$e^{j\pi[\Delta_{iu}(2k/N-1/L_i)]} \frac{q_i \sin(\pi\hat{\epsilon}_i/L_i)}{L_i \sin[\pi(\Delta_{iu}+\hat{\epsilon}_i)/L_i]} \quad (12)$$

The fourth multiplier 258 multiplies the expansion result of the length of $$\hat{z}_k^{(i)[i]}$$

input from the signal expander and reducer 252 by the second gain input from the second gain calculator 254 and then outputs the multiplication result to the third selector 262. The fifth multiplier 260 multiplies the reduction result of the length of $$\hat{z}_k^{(i)[i]}$$

input from the signal expander and reducer 252 by the third gain input from the third gain calculator 256 and then outputs the multiplication result to the third selector 262.

The third selector 262 selects one of the multiplication results input from the fourth and fifth multipliers 258 and 260 in response to the comparison result input from the comparator 250 and then outputs the selection result as the i$^{th}$ interference $\hat{z}_k^{(i)[i]}$.

For example, if the third selector 262 perceives through the comparison result input from the comparator 250 that the number $N_i$ of subcarriers used by the $i^{th}$ other user is less than the number $N_u$ of subcarriers used by the $u^{th}$ user, the third selector 262 selects the multiplication result obtained by the fourth multiplier 258. However, if the third selector 262 perceives through the comparison result input from the comparator 250 that the number $N_i$ of subcarriers used by the $i^{th}$ other user is greater than the number $N_u$ of subcarriers used by the $u^{th}$ user, the third selector 262 selects the multiplication result obtained by the fifth multiplier 260.

The adder 216 shown in FIG. 6 adds the first, ..., $i^{th}$, ..., and U–1$^{th}$ interferences output from the first, ..., $i^{th}$, ..., and U–1$^{th}$ extent estimators 210, ..., 212, ..., and 214 and then output the addition result as the interference expressed by Equation 5 via an output port OUT4.

The feedback signal generator 218 shown in FIG. 6 generates feedback signals $z_k^{(1)[1]}, \ldots, z_k^{(i)[i]}, \ldots,$ and $z_k^{(U-1)[U-1]}$ used in the first, ..., $i^{th}$, ..., and U–1$^{th}$ sub frequency offset estimators 200, ..., 202, ..., and 204 from the first gain input via an input port IN1, the selection signal input via an input port IN2, the first, ..., $i^{th}$, ..., and U–1$^{th}$ interferences input from the first, ..., $i^{th}$, ..., and U–1$^{th}$ extent estimators 210, ..., 212, ..., and 214, and the reception signals $r_k^{[1]}, \ldots, r_k^{[i]}, \ldots,$ and $r_k^{[U-1]}$ for the other users.

Figure 9:
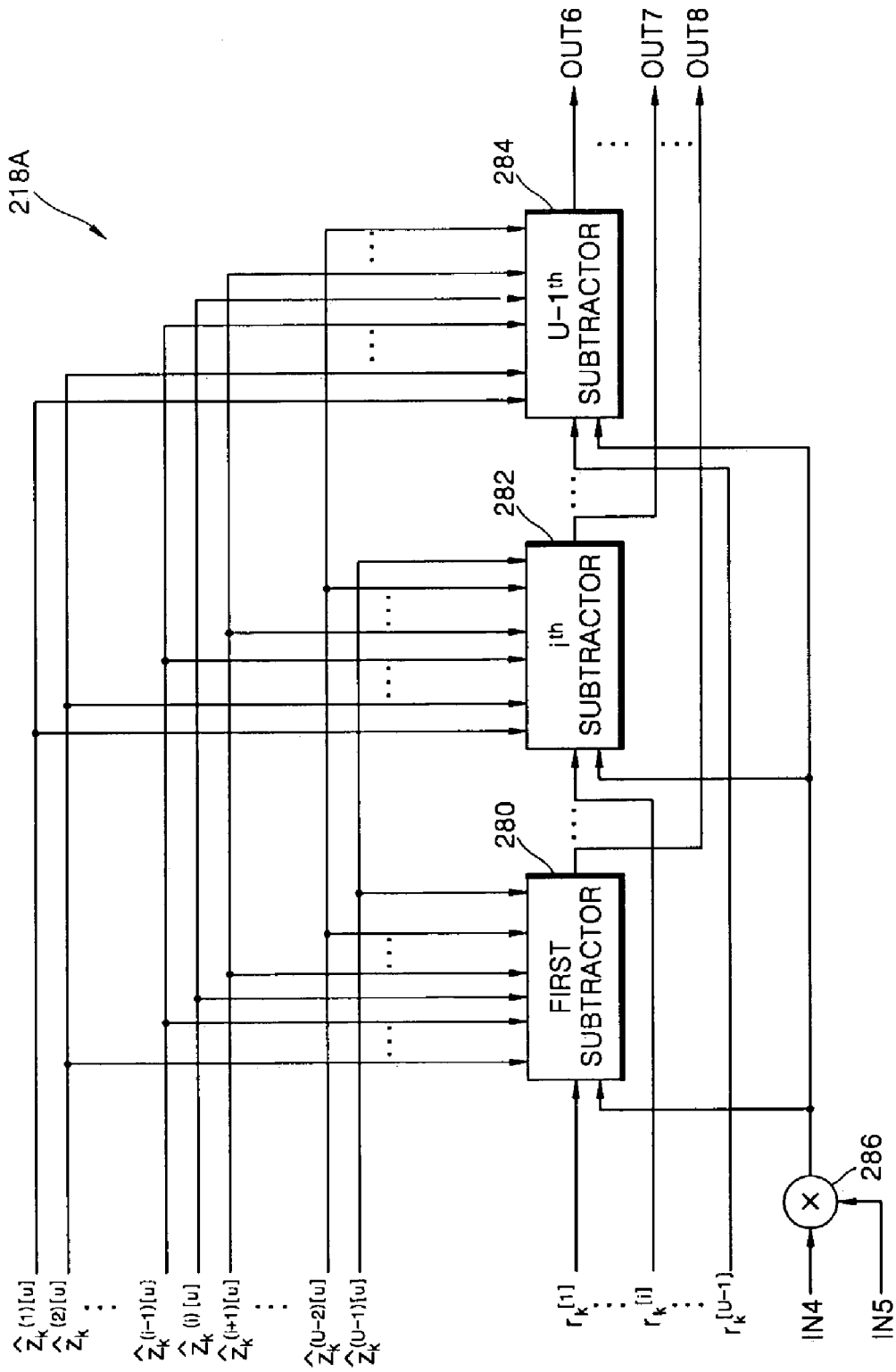
FIG. 9 is a block diagram of a preferred embodiment of the present invention of a feedback signal generator shown in FIG. 6.

FIG. 9 is a block diagram of a preferred embodiment 218A of the present invention of the feedback signal generator 218 shown in FIG. 6. The feedback signal generator 218A includes first, ..., $i^{th}$, ..., and U–1$^{th}$ subtractors 280, ..., 282, ..., and 284 and a sixth multiplier 286.

According to an embodiment of the present invention, the feedback signal generator 218A shown in FIG. 9 can include the sixth multiplier 286 to receive the first gain output from the first gain calculator 190 of the transmission signal estimator 166A shown in FIG. 5 via an output port OUT3, via an input port IN4, to receive the selection signal output from the first selector 180 of the main frequency offset estimator 160A via the output port OUT2, via an input port IN5, to multiply the selection signal by the first gain, and to output the multiplication result to each of the first, ..., $i^{th}$, ..., and U–1$^{th}$ subtractors 280, ..., 282, ..., and 284.

According to another embodiment of the present invention, the feedback signal generator 218A shown in FIG. 9 can further include a gain generator (not shown). In this case, the gain generator can receive the estimated frequency offset $\hat{\epsilon}_{\tilde{u}}$ input from the main frequency offset estimator 160 via the input port IN1 to calculate a first gain using Equation 8. Here, the sixth multiplier 286 receives the first gain generated by the gain generator instead of receiving the first gain from the transmission signal estimator 166A via the input port IN4 and then multiplies the first gain by the selection signal input via the input port IN5.

The first subtractor 280 subtracts interferences $$\hat{z}_k^{(2)(u)}, \ldots, \hat{z}_k^{(i-1)[u]}, \hat{z}_k^{(i)[u]}, \hat{z}_k^{(i+1)[u]} \ldots, \hat{z}_k^{(U-2)[u]}, \text{ and } \hat{z}_k^{(U-1)[u]}$$

of the second through U–1$^{th}$ interferences and the multiplication result obtained by the sixth multiplier 286 from the reception signal $r_k^{[1]}$ for the first other user and then outputs the subtraction result as the feedback signal $z_k^{(1)[l]}$ used in the first sub frequency offset estimator 200 via an output port OUT6.

The $i^{th}$ subtractor 282 of the first, ..., $i^{th}$, ..., and U–1$^{th}$ subtractors 280, ..., 282, ..., and 284 subtracts interferences $$\hat{z}_k^{(1)[u]}, \hat{z}_k^{(2)(u)} \ldots, \hat{z}_k^{(i-1)[u]}, \hat{z}_k^{(i+1)[u]} \ldots, \hat{z}_k^{(U-2)[u]}, \text{ and } \hat{z}_k^{(U-1)[u]}$$

of the first through U–1$^{th}$ interferences from which the $i^{th}$ interference is excluded and the multiplication result obtained by the sixth multiplier 286 from the reception signal $r_k^{[i]}$ for the $i^{th}$ other user and then outputs the subtraction result as the feedback signal $z_k^{(i)[l]}$ used in the $i^{th}$ sub frequency offset estimator 202 via an output port OUT7.

The U–1$^{th}$ subtractor 284 subtracts interferences $$\hat{z}_k^{(1)[u]}, \hat{z}_k^{(2)(u)} \ldots, \hat{z}_k^{(i-1)[u]}, \hat{z}_k^{(i)[u]}, \hat{z}_k^{(i+1)[u]}, \ldots, \text{ and } \hat{z}_k^{(U-2)[u]}$$

of the first through U–2$^{th}$ interferences and the multiplication result obtained by the sixth multiplier 286 from the reception signal $r_k^{[U-1]}$ for the U–1$^{th}$ other user and then outputs the subtraction result as the feedback signal $z_k^{(U-1)[U-1]}$ used in the U–1$^{th}$ sub frequency offset estimator 204 via an output port OUT8.

In order to help understand the method and apparatus for compensating for frequency offset in an IFDMA according to the present invention, let us assume that U is 8, each of the users uses 32 subcarriers, each of the subcarriers uses quadrature phase shift keying (QPSK), the frequency offsets of the users are the same, and additive white Gaussian noise (AWGN) is input via channels.

Figure 10:
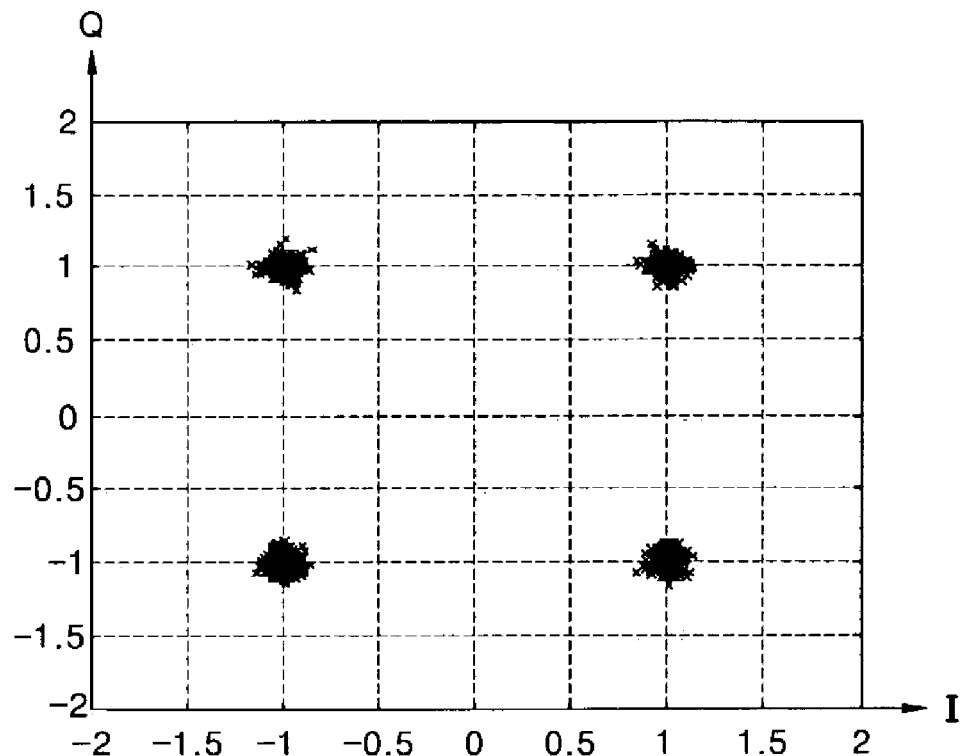
FIG. 10 is a graph for illustrating the constellation of an ideally reception signal that does not have a frequency offset.

FIG. 10 illustrates the constellation of an ideal reception signal that does not have a frequency offset where the vertical and horizontal axes denote quadrature Q and in-phase I, respectively. Referring to FIG. 10, spots [(−1, −1), (1, −1), (−1, 1), and (1, 1)] indicating reception signals on coordinates of I and Q are circularly spread due to the effect of noise input via channels.

Figure 11:
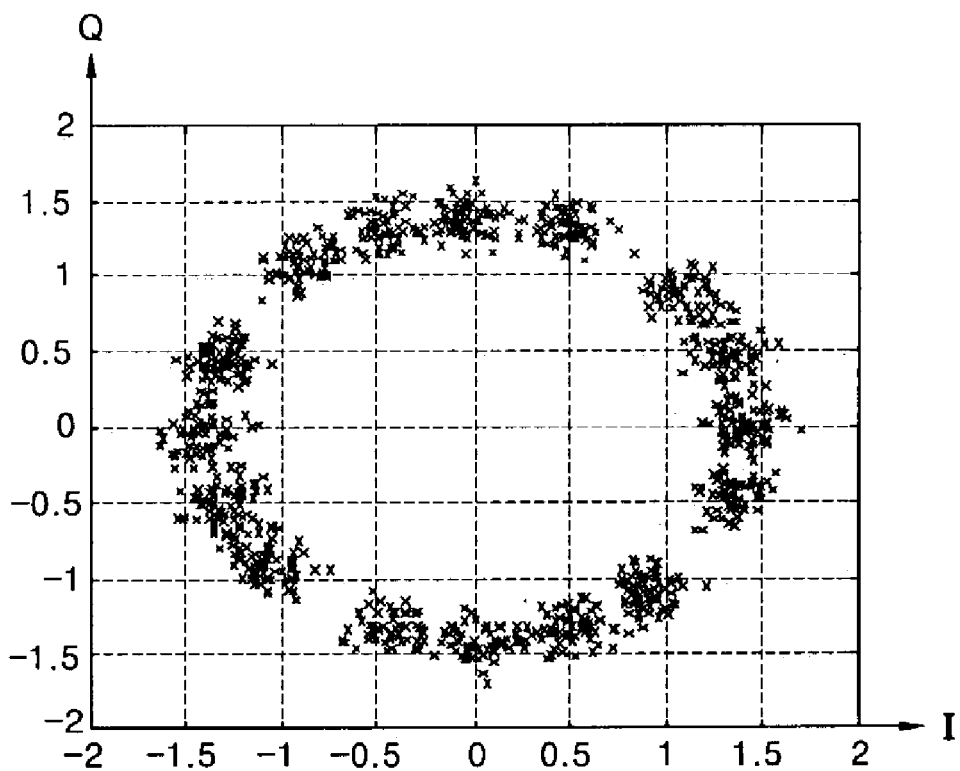
FIG. 11 is a graph for illustrating the constellation of a reception signal when a frequency offset accounts for 3% of the distance among sub-carriers.
Figure 12:
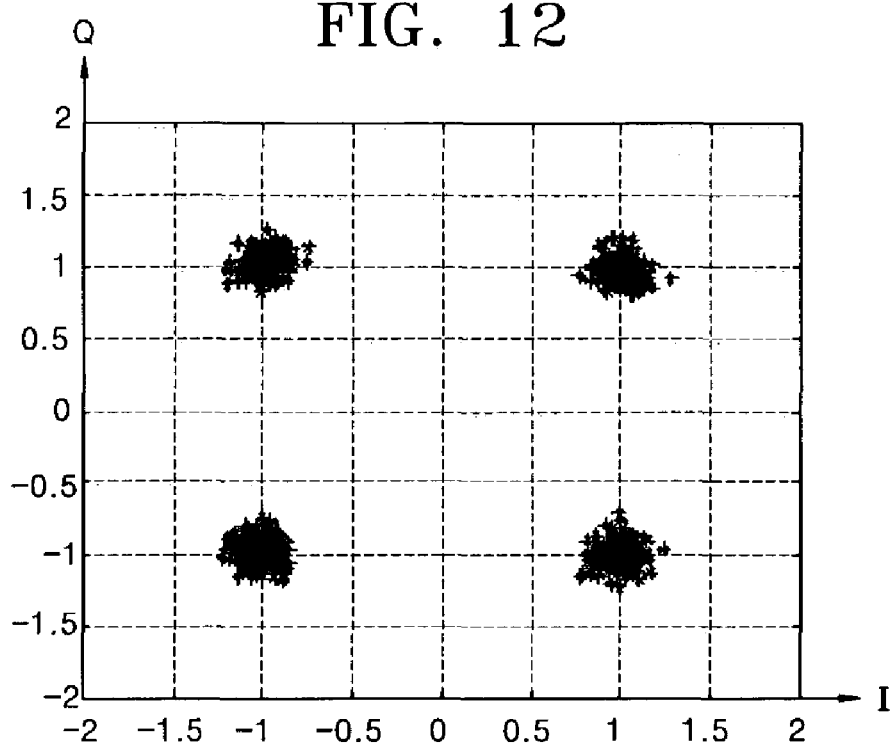
FIG. 12 is a graph for illustrating the constellation of a reception signal when the method and apparatus of the present invention are used to compensate for the frequency offset in the reception signal shown in FIG. 11.

FIG. 11 is a graph for illustrating the constellation of a reception signal when a frequency offset accounts for 3% of the distance among subcarriers, and FIG. 12 illustrates the constellation of a reception signal when the method and apparatus according to the present invention are applied to constellation shown in FIG. 11.

Referring to FIG. 11, the constellation is circular due to the effect of the frequency offset and interferences among users. When the frequency offset compensating method and apparatus according to the present invention are applied to the circular constellation, the constellation is spread more than the constellation shown in FIG. 10 but does not show the same circular constellation as in FIG. 12.

The relationship among the predetermined number, SNR, and bit error rate (BER) will be described below.

Figure 13:
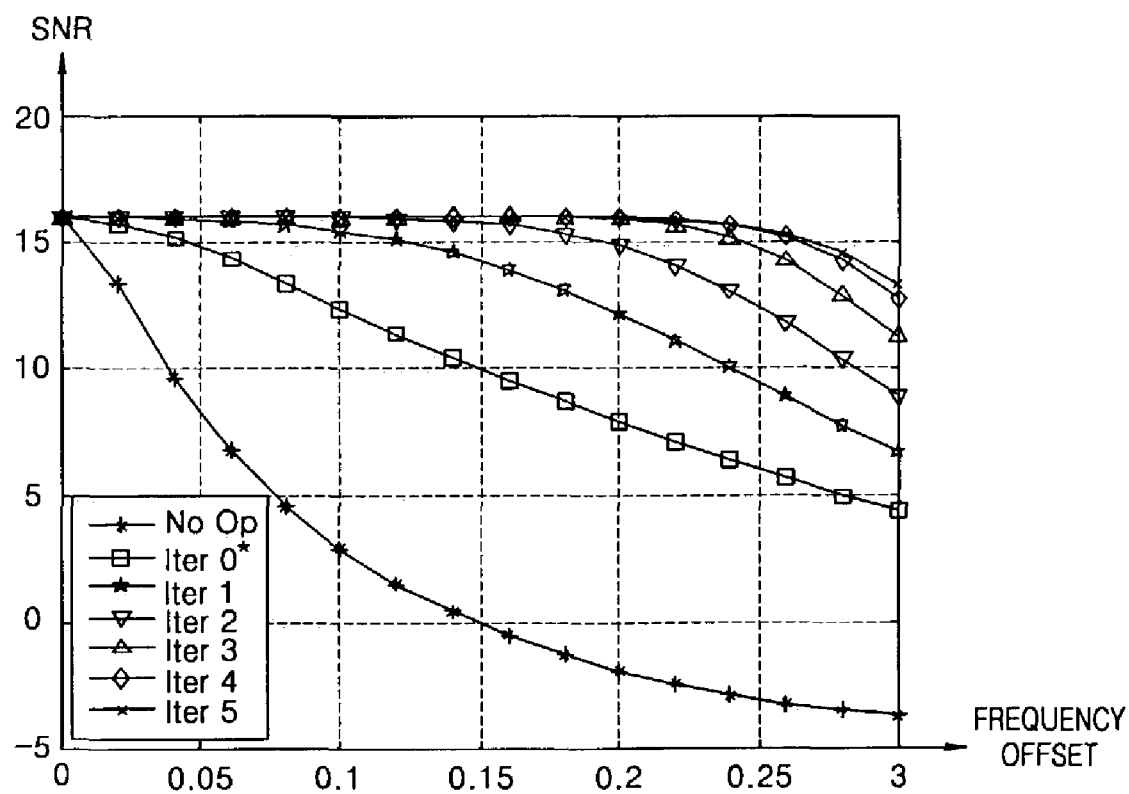
FIG. 13 is a graph for illustrating a SNR versus the frequency offset.
Figure 14:
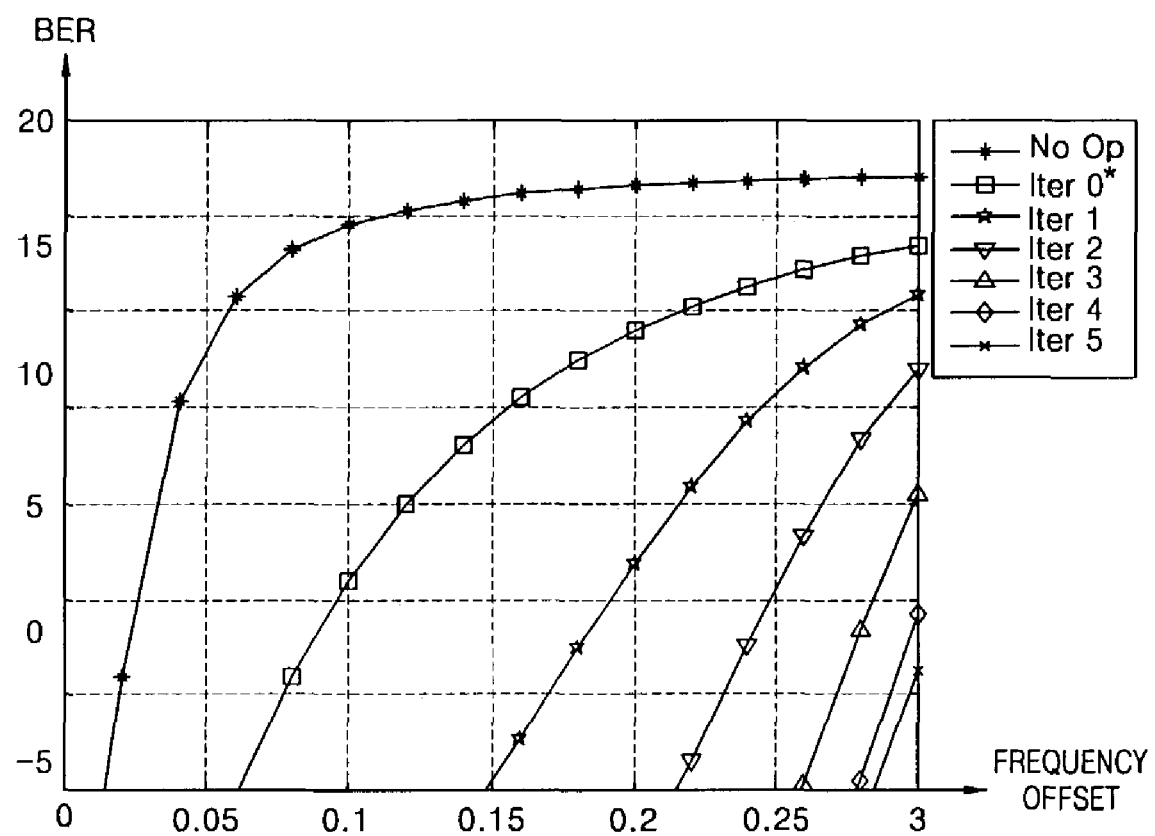
FIG. 14 is a graph for illustrating a bit error rate (BER) versus the frequency offset.

FIG. 13 is a graph for illustrating a SNR versus the frequency offset where the horizontal and vertical axes denote the frequency offset and SNR, respectively. FIG. 14 is a graph for illustrating variations in BER versus the frequency offset where the horizontal and vertical axes denote the frequency offset and BER, respectively.

In FIGS. 13 and 14, 'No OP' represents an SNR when the frequency offset is not compensated for, 'Iter 0' represents an SNR when steps 10, 12, and 14 are not repeated, 'Iter 1' represents an SNR when the predetermined number of times is 1, 'Iter 2' represents an SNR when the predetermined number of times is 2, 'Iter 3' represents an SNR when the predetermined number of times is 3, 'Iter 4' represents an SNR when the predetermined number of times is 4, and 'Iter 5' represents an SNR when the predetermined number of times is 5.

As can be seen in FIG. 13, the SNR sharply improves with an increase in the predetermined number of repetitions. In particular, comparing 'No Op' and 'Iter 1', the SNR is increased by 12 dB by compensating for the frequency offset when the frequency offset accounts for 10% of the distance among the subcarriers. Accordingly, if the frequency offset is large, the SNR can be improved with an increase in the predetermined number of times. As can be seen in FIG. 14, if the frequency offset becomes large, the predetermined number of repetitions should be increased to obtain a BER of about $10^{-6}$.

As described above, unlike the prior art using analog RF/IF ports for removing a frequency offset, a method and apparatus for compensating for the frequency offset in an IFDMA according to the present invention can remove the amplitude and phase distortions of a reception signal caused by an existing frequency offset and interferences among users in a base band instead of removing the frequency offset. Therefore, cost for designing and realizing circuits can be reduced and the frequency offset can be compensated for before estimating the characteristics of channels.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of compensating for a frequency offset between a transmission signal and a reception signal for a $u^{th}$ user ($1 \leq u \leq U$, where U denotes the number of users) in an interleaved frequency division multiple access (IFDMA) system, the method comprising the steps of:
   (a) estimating the frequency offset from a selection signal in the IFDMA system that is determined as the reception signal for the $u^{th}$ user in an initial mode and as a feedback signal in a normal mode;
   (b) estimating multiple access interferences representing an extent to which reception signals for $i^{th}$ other users ($1 \leq i \leq U-1$) at the same time interfere with the reception signal for the $u^{th}$ user;
   (c) subtracting the estimated multiple access interferences from the reception signal for the $u^{th}$ user and determining the subtraction result as the feedback signal;
   (d) determining whether steps (a), (b), and (c) have been repeated a predetermined number of times, and if it is determined that steps (a), (b), and (c) have not been repeated the predetermined number of times, going back to step (a); and
   (e) if it is determined that steps (a), (b), and (c) have been repeated the predetermined number of times, estimating the transmission signal for the $u^{th}$ user using the feedback signal finally determined in step (c) and the estimated frequency offset,
   wherein in step (a), the frequency offset is estimated from the selection signal using the following equation:

$$\hat{\varepsilon}_u = \frac{\angle C_u}{2\pi}$$

where $\hat{\varepsilon}_u$ denotes the frequency offset, $$|\hat{\varepsilon}_u| < \frac{1}{2}, \angle C_u,$$

denotes the angle of a correlation value $$\sum_{k=1}^{N_u-1} (\widehat{z_{k+N}^{(u)[u]}} \widehat{z_k^{(u)[u]}})^*,$$

$N_u$ denotes the number of carriers used by the $u^{th}$ user, k (k=0, 1, ..., and $N_u-1$) denotes the order of the reception signal for the $u^{th}$ user among a plurality of signals contained in a frame, $$\widehat{z_k^{(u)[u]}}$$

denotes the selection signal, N denotes the number of chips constituting a block, $$\widehat{z_{k+N}^{(u)[u]}}$$

denotes the result obtained by delaying the selection signal $$\widehat{z_k^{(u)[u]}}$$

by N, and $$\left(\widehat{z_k^{(u)[u]}}\right)^*$$

denotes a conjugate of the selection signal $$\widehat{z_k^{(u)[u]}}.$$

2. The method of claim 1, wherein in step (b), the extent $$\widehat{z_k^{(i)[u]}}$$

to which the $i^{th}$ other user among other users interfere with the $u^{th}$ user is estimated using the following equation:

$$\hat{z}_k^{(i)[u]} = \begin{cases} e^{j\pi[\Delta_{iu}(2k/N-1/L_u)+\hat{\varepsilon}_i(1/L_i-1/L_u)]} \dfrac{q_i \sin(\pi\hat{\varepsilon}_i/L_i)}{L_i \sin[\pi(\Delta_{iu}+\hat{\varepsilon}_i)/L_u]} \cdot \\ \quad \hat{z}_{k\%N_i}^{(i)[i]}, \text{ for } N_i \leq N_u \\ e^{j\pi[\Delta_{iu}(2k/N-1/L_i)]} \dfrac{q_i \sin(\pi\hat{\varepsilon}_i/L_i)}{L_i \sin[\pi(\Delta_{iu}+\hat{\varepsilon}_i)/L_i]} \cdot \sum_{l=0}^{M_{iu}-1} \\ e^{j2\pi(\Delta_{iu}+\hat{\varepsilon}_i)l/L_u} \hat{z}_{k+lN_u}^{(i)[i]}, \text{ for } N_i > N_u \end{cases}$$

where k % $N_i$ denotes the remainder when k is divided by $N_i$, $N_i$ denotes the number of carriers used by the $i^{th}$ user, $L_i$ denotes the number of times user symbols are repeated in a transmitter for the $i^{th}$ user, $L_u$ denotes the number of times user symbols are repeated in a transmitter for the $u^{th}$ user, $\Delta_{iu}$ denotes $n_i-n_u$, $n_i$ denotes a frequency offset assigned to the $i^{th}$ user, $n_u$ denotes a frequency offset assigned to the $u^{th}$ user, $q_i$ denotes an initial phase offset in an $i^{th}$ block, and $$M_{iu} = \frac{N_i}{N_u} = \frac{L_u}{L_i}.$$

3. The method of claim 2, wherein in step (c), the estimated interference $$\sum_{i=1,i\neq u}^{U} \hat{z}_k^{(i)[u]}$$

is subtracted from the reception signal for the $u^{th}$ user using the following equation:

$$\hat{z}_k^{(u)[u]} = r_k^{[u]} - \sum_{i=1,i\neq u}^{U} \hat{z}_k^{(i)[u]}$$

where $$\hat{z}_k^{(u)[u]}$$

is the feedback signal and $r_k^{[u]}$ denotes the reception signal for the $u^{th}$ user.

4. The method of claim 3, wherein the predetermined number of times is determined in proportion to a rate by which a signal-to-noise ratio decreases.

5. The method of claim 4, wherein in step (e), if it is determined that steps (a), (b), and (c) have been repeated the predetermined number of times, the transmission signal $y_k^{[u]}$ for the $u^{th}$ user is estimated using the feedback signal $$\hat{z}_k^{(u)[u]}$$

finally determined in step (c) and the estimated frequency offset $\hat{\varepsilon}_u$ according to the following equation:

$$y_k^{[u]} = e^{-j\pi[\Delta_{iu}(2k/N-1/L_u)+1]} \frac{L_u \sin(\pi\hat{\varepsilon}_u/L_u)}{\hat{q}_u \sin(\pi\hat{\varepsilon}_u)} \hat{z}_k^{(u)[u]}$$

where $y_k^{[u]}$ denotes the estimated transmission signal for the $u^{th}$ user and $q_u$ denotes an initial phase offset in an $u^{th}$ block.

6. An apparatus for compensating for a frequency offset between a transmission signal and a reception signal for an $u^{th}$ user ($1 \leq u \leq U$, where U denotes the number of users) in an interleaved frequency division multiple access (IFDMA) system, the apparatus comprising:

a main frequency offset estimator for determining the reception signal for the $u^{th}$ user or a feedback signal as a selection signal in response to a first control signal in the IFDMA system, estimating the frequency offset from the selection signal, and outputting the estimated frequency offset;

an extent estimator for estimating multiple access interferences representing an extent to which reception signals for from $i^{th}$ other users ($1 \leq i \leq U-1$) interfere with the reception signal for the $u^{th}$ user, from the reception signals for the $i^{th}$ other users, the selection signal, and the estimated frequency offset, and outputting the estimated multiple access interferences;

a subtractor for subtracting the estimated interferences from the reception signal for the $u^{th}$ user and outputting the subtraction result as the feedback signal;

a controller for generating the first control signal in response to the result obtained by analyzing the state of the apparatus for compensating for the frequency offset, checking whether a predetermined period of time has elapsed, and outputting a second control signal in response to the checked result; and a transmission signal estimator for estimating the transmission signal for the $u^{th}$ user from the feedback signal finally input from the subtractor and the estimated frequency offset in response to the second control signal and outputting the estimated transmission signal, wherein the main frequency offset estimator, the extent estimator, and the subtractor are enabled in response to the second control signal, wherein the main frequency offset estimator comprises:

a first selector for selecting one of the feedback signals input from the subtractor and the reception signal for the $u^{th}$ user input from the outside in response to the first control signal and outputting the selection result as the selection signal;

a first delayer for delays the selection signal input from the first selector by a unit block and outputting the delayed selection signal;

a first conjugate calculator for calculating a conjugate of the selection signal input from the first selector and outputting the calculated conjugate of the selection signal;

a first multiplier for multiplying the conjugate of the selection signal input from the first conjugating calculator by the delayed selection signal input from the first delayer and outputting the multiplication result; and a first offset calculator for accumulating the multiplication result input from the first multiplier by $N_u-1$ that is one less than the number $N_u$ of carriers used by the $u^{th}$ user, calculating an angle of the accumulation result, divides the angle by a predetermined number, and outputting the division result as the estimated frequency offset, wherein the first selector, the first delayer, the first conjugate calculator, the first multiplier, and the first frequency offset are enabled in response to the second control signal.

7. The apparatus of claim 6, wherein the transmission signal estimator comprises:

a first gain calculator for calculating a gain from the estimated frequency offset input from the main frequency offset estimator using equation below and outputting the calculation result as a first gain:

$$-e^{-j\pi[\Delta_{iu}(2k/N-1/L_u)+1]} \frac{L_u \sin(\pi \hat{\varepsilon}_u / L_u)}{q_u \sin(\pi \hat{\varepsilon}_u)}$$

where k (k=0, 1, . . . , and $N_u$–1) denotes the order of the corresponding reception signal for the $u^{th}$ user among a plurality of reception signals contained in a frame, N denotes the number of chips constituting a block, $L_u$ denotes the number of times user symbols are repeated in a transmitter for the $u^{th}$ user, $\varepsilon_u$ denotes the frequency offset for the $u^{th}$ user, $\Delta_{iu}$ denotes $n_i$–$n_u$, $n_i$ denotes a frequency offset assigned to the $i^{th}$ user, $n_u$ denotes a frequency offset assigned to the $u^{th}$ user, and $q_u$ denotes an initial phase offset in an $u^{th}$ block;

an inverter for inverting the first gain; and a second multiplier for multiplying the feedback signal finally input from the subtractor by the inverted first gain and outputting the multiplication result as the estimated transmission signal, wherein the first gain calculator, the inverter, and the second multiplier are enabled in response to the second control signal.

8. The apparatus of claim 7, wherein the extent estimator comprises:

first through U–1$^{th}$ sub frequency offset estimators;

first through U–1$^{th}$ extent estimators that estimate the first through U–1$^{th}$ interferences;

an adder; and a feedback signal generator, wherein the $i^{th}$ sub frequency offset estimator selects the feedback signal for the $i^{th}$ user or the reception signal for the $i^{th}$ other user in response to the first control signal and then estimates a frequency offset for the $i^{th}$ other user from the selection result, the $i^{th}$ extent estimator estimates the $i^{th}$ interference corresponding to the extent to which the reception signal for the $i^{th}$ other user interfere with the reception signal for the $u^{th}$ user, from the frequency offset for the $i^{th}$ other user and the selection result selected by the $i^{th}$ sub frequency offset estimator, the adder adds the first through U–1$^{th}$ interferences and then outputs the addition result as the interference, and the feedback signal generator generates feedback signals used in the first through U–1$^{th}$ sub frequency offset estimators from the first gain, the selection signal, the first through U–1$^{th}$ interferences, and the reception signals for the other users.

9. The apparatus of claim 8, wherein the $i^{th}$ sub frequency offset estimator comprises:

a second selector for selecting one of the feedback signal for the $i^{th}$ other user and the reception signal for the $i^{th}$ other user input from the outside in response to the first control signal and outputting the selection result;

a second delayer for delays the selection result input from the second selector by the unit block and then outputting the delayed result;

a second conjugate calculator for calculating a conjugate of the selection result input from the second selector and then outputting the calculation result;

a third multiplier for multiplying the calculation result input from the second conjugate calculator by the delayed result input from the second delayer and then outputting the multiplication result; and a second offset calculator for accumulating the multiplication result input from the third multiplier by $N_i$–1 that is one less than the number $N_i$ of carriers used by the $i^{th}$ other user, calculating an angle of the accumulation result, dividing the angle by a predetermined number, and outputting the division result as the estimated frequency offset for the $i^{th}$ other user.

10. The apparatus of claim 8, wherein the $i^{th}$ extent estimator comprises:

a comparator for comparing the number $N_u$ of subcarriers used by the $u^{th}$ user with the number $N_i$ of subcarriers used by the $i^{th}$ other user and then outputting the comparison result;

a signal expander and reducer for expanding or reducing the length of the selection result $$\hat{z}_k^{(i)[i]}$$

input from the second selector in response to the comparison result input from the comparator according to equation below and then outputting the expansion or reduction result:

$$\hat{z}_{k \% N_i}^{(i)[i]} \quad \text{for } N_i \leq N_u$$

$$\sum_{l=0}^{M_{iu}-1} e^{j2\pi(\Delta_{iu}+\hat{\varepsilon}_i)1/L_u} \hat{z}_{k+1 N_u}^{(i)[i]} \quad \text{for } N_i > N_u$$

where $\hat{\varepsilon}_i$ denotes the frequency offset for the $i^{th}$ user;

a second gain calculator for calculating a gain from the frequency offset, for the $i^{th}$ other user, input from the $i^{th}$ sub frequency offset estimator according to equation below and then outputting the calculation result as a second gain:

$$e^{j\pi[\Delta_{iu}(2k/N-1/L_u)+\hat{\varepsilon}_i(1/L_i-1/L_u)]} \frac{q_i \sin(\pi \hat{\varepsilon}_i / L_i)}{L_i \sin[\pi(\Delta_{iu}+\hat{\varepsilon}_i)/L_u]}$$

where $L_i$ denotes the number of times user symbols are repeated in a transmitter for the $i^{th}$ user and $q_i$ denotes an initial phase offset in an $i^{th}$ block;

a third gain calculator for calculating a gain from the frequency offset, for the $i^{th}$ other user, input from the $i^{th}$ sub frequency offset estimator according to equation below and then outputting the calculation result as a third gain:

$$e^{j\pi[\Delta_{iu}(2k/N-1/L_i)]} \frac{q_i \sin(\pi \hat{\varepsilon}_i / L_i)}{L_i \sin[\pi(\Delta_{iu}+\hat{\varepsilon}_i)/L_i]}$$

-continued where $M_{iu} = \frac{N_i}{N_u} = \frac{L_u}{L_i}$;

a fourth multiplier for multiplying the expansion result input from the signal expander and reducer by the second gain and then outputting the multiplication result;

a fifth multiplier for multiplying the reduction result input from the signal expander and reducer by the third gain and then outputting the multiplication result; and a third selector for selecting one of the multiplication results input from the fourth and fifth multipliers in response to the comparison result input from the comparator and then outputting the selection result as the $i^{th}$ interference.

11. The apparatus of claim 8, wherein the feedback signal generator comprises:

a sixth multiplier for multiplying the first gain input from the first gain calculator by the selection signal input from the first selector and then outputting the multiplication result; and first through U–1$^{th}$ subtractors, wherein the $i^{th}$ subtractor subtracts the interferences of the first through U–1$^{th}$ interferences from which the $i^{th}$ interference is excluded, and the multiplication result of the sixth multiplier from the reception signal for the $i^{th}$ other user and then outputs the subtraction result as the feedback signal used in the $i^{th}$ sub frequency offset estimator.

\* \* \* \* \*